(12) United States Patent
Emamjomeh et al.

(10) Patent No.: US 10,392,512 B2
(45) Date of Patent: Aug. 27, 2019

(54) DETAILING AGENT FOR THREE-DIMENSIONAL (3D) PRINTING

(71) Applicant: Hewlett-Packard Development Company, L.P., Houston, TX (US)

(72) Inventors: Ali Emamjomeh, San Diego, CA (US); Keshava A. Prasad, San Marcos, CA (US); Michael A. Novick, San Diego, CA (US); Erica Montei Fung, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 110 days.

(21) Appl. No.: 15/546,607

(22) PCT Filed: Apr. 24, 2015

(86) PCT No.: PCT/US2015/027568
§ 371 (c)(1),
(2) Date: Jul. 26, 2017

(87) PCT Pub. No.: WO2016/171724
PCT Pub. Date: Oct. 27, 2016

(65) Prior Publication Data
US 2018/0022923 A1 Jan. 25, 2018

(51) Int. Cl.
*C09B 47/06* (2006.01)
*C09B 11/12* (2006.01)
(Continued)

(52) U.S. Cl.
CPC ............ *C09B 47/065* (2013.01); *B29C 64/10* (2017.08); *B29C 64/165* (2017.08); *B33Y 10/00* (2014.12);
(Continued)

(58) Field of Classification Search
CPC ..... C09B 47/065; C09B 11/12; C09B 31/072; C09B 31/08; C09B 33/10; C09B 45/28;
(Continued)

(56) References Cited

U.S. PATENT DOCUMENTS 4,128,544 A * 12/1978 Schneider ............. C09B 62/032
534/599
6,589,471 B1 7/2003 Khoshnevis
(Continued)

FOREIGN PATENT DOCUMENTS

CN 102977637 3/2013
CN 104059387 9/2014
(Continued)

OTHER PUBLICATIONS

International Search Report and Written Opinion for International Application No. PCT/US2015/027568 dated Jan. 14, 2016, 9 pages.

*Primary Examiner* — Robert D Harlan
(74) *Attorney, Agent, or Firm* — Dierker & Kavanaugh PC

(57) ABSTRACT

A detailing agent for three-dimensional (3D) printing includes a colorant present in an amount ranging from about 1.00 wt % to about 3.00 wt % based on a total weight of the detailing agent. The colorant is a dye having substantially no absorbance in a range of 650 nm to 2500 nm. The detailing agent also includes a co-solvent, a surfactant, and a balance of water.

15 Claims, 7 Drawing Sheets

(51) Int. Cl.

| | | |
|---|---|---|
| *C09B 31/072* | (2006.01) | |
| *C09B 33/10* | (2006.01) | |
| *C09B 45/28* | (2006.01) | |
| *C09B 31/08* | (2006.01) | |
| *B33Y 10/00* | (2015.01) | |
| *B33Y 70/00* | (2015.01) | |
| *B29C 64/10* | (2017.01) | |
| *C09B 47/067* | (2006.01) | |
| *C09B 47/26* | (2006.01) | |
| *C09D 11/324* | (2014.01) | |
| *C09D 11/328* | (2014.01) | |
| *C09B 67/22* | (2006.01) | |
| *B29C 64/165* | (2017.01) | |
| *B29K 105/00* | (2006.01) | |

(52) U.S. Cl.
CPC .............. *B33Y 70/00* (2014.12); *C09B 11/12* (2013.01); *C09B 31/072* (2013.01); *C09B 31/08* (2013.01); *C09B 33/10* (2013.01); *C09B 45/28* (2013.01); *C09B 47/0678* (2013.01); *C09B 47/26* (2013.01); *C09B 67/0041* (2013.01); *C09D 11/324* (2013.01); *C09D 11/328* (2013.01); *B29K 2105/0032* (2013.01)

(58) Field of Classification Search
CPC ....... B33Y 10/00; B33Y 70/00; C09D 11/328; B29C 64/10
See application file for complete search history.

(56) References Cited

U.S. PATENT DOCUMENTS

| | | | |
|---|---|---|---|
| 7,708,929 B2 * | 5/2010 | Monsheimer | B29C 67/0077 264/460 |
| 7,879,282 B2 | 2/2011 | Hopkinson et al. | |
| 8,916,334 B2 | 12/2014 | Ganapathiappan et al. | |
| 2007/0241482 A1 | 10/2007 | Giller et al. | |
| 2014/0121813 A1 | 5/2014 | Schmehl | |
| 2014/0275317 A1 | 9/2014 | Moussa | |

FOREIGN PATENT DOCUMENTS

| | | |
|---|---|---|
| CN | 104231669 | 12/2014 |
| EP | 2585545 | 5/2013 |
| WO | WO 2015/028499 | 3/2015 |
| WO | WO-2015056230 | 4/2015 |
| WO | WO-2016053245 | 4/2016 |

* cited by examiner

DETAILING AGENT FOR THREE-DIMENSIONAL (3D) PRINTING

BACKGROUND

Three-dimensional (3D) printing may be an additive printing process used to make three-dimensional solid objects from a digital model. 3D printing is often used in rapid product prototyping, mold generation, and mold master generation. Some 3D printing techniques are considered additive processes because they involve the application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
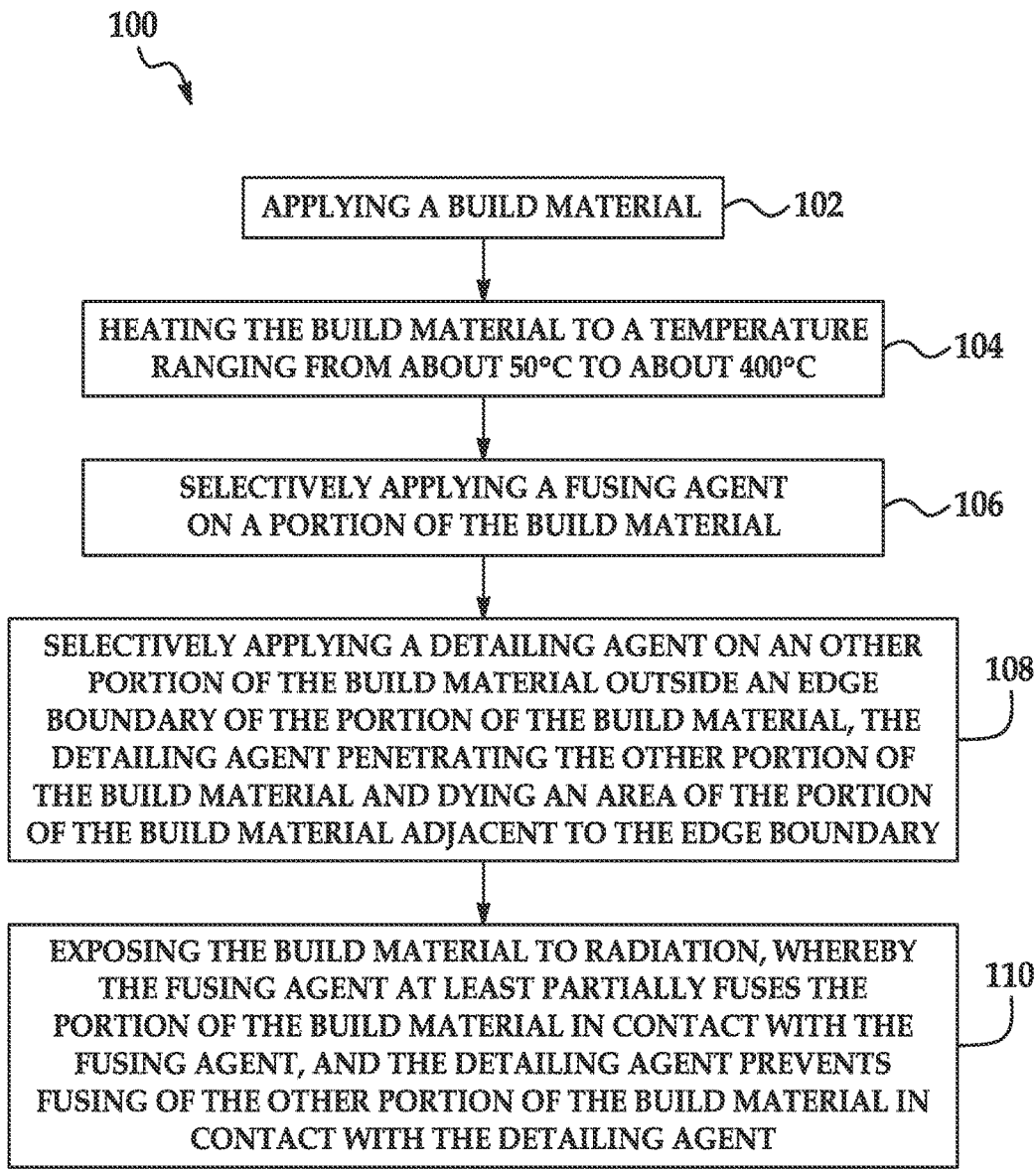
FIG. 1 is a flow diagram illustrating an example of a 3D printing method disclosed herein.

Examples of the three-dimensional (3D) printing method disclosed herein utilize multi jet fusion (MJF). During multi jet fusion, an entire layer of a build material (also referred to as build material particles) is exposed to radiation, but a selected region (in some instances less than the entire layer) of the build material is fused and hardened to become a layer of a 3D object. In the examples disclosed herein, a fusing agent is selectively deposited in contact with the selected region of the build material. The fusing agent(s) is/are capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, cure, etc. to form the layer of the 3D object.

In some instances, it has been found that the thermal energy may propagate into surrounding build material. This may result in the subsequent solidification of area(s)/portion(s) of the build material that were not intended to be solidified, and this effect is referred to herein as coalescence bleed. Coalescence bleed may result, for example, in a reduction in the overall dimensional accuracy of generated 3D objects. For example, edge acuity may be undesirably rough, undefined, etc.

The effects of coalescence bleed during formation of the 3D object may be managed by delivering an example of the detailing agent disclosed herein to appropriate portion(s) of the build material prior to radiation exposure. The detailing agent includes a colorant that does not absorb the radiation used for fusing. The detailing agent may be applied outside of the edge boundary (i.e., the outermost portions where the fusing agent is selectively deposited onto the build material during 3D printing) of the 3D object during its formation. Since the colorant in the detailing agent does not absorb the fusing radiation, it combats coalescence bleed at the edge boundary. As such, the colorant in the detailing agent does not contribute to object growth (by fusing build material particles together), but rather contributes to edge acuity.

Examples of the detailing agent also serve to reduce the degree of coalescence, or prevent coalescence of a portion of the build material on which the detailing agent has been delivered or has penetrated by providing an evaporative cooling effect. The cooling effect of the detailing agent reduces the temperature of the build material containing the detailing agent during radiation exposure. Since the build material, with detailing agent applied thereto, has a reduced temperature, the coalescence bleed may be reduced or prevented. As such, the detailing agent disclosed herein contributes to the generation of dimensionally accurate 3D objects in real-time without the need for post-object mechanical refining processes (e.g., tumbling, stone polishing, etc.).

Furthermore, after fusing, build material particles at the edges of the 3D object may be partially fused. With partially fused build material particles, it is to be understood that portions of these build material particles will be removed with other unfused build material. Removal of these particle portions at the edges of the 3D object may reveal the build material color (e.g., white) rather than the color of the fusing agent (and thus the color of the 3D object). Some colorants used in the fusing agent have a particle size which limits the diffusivity of the colorant when penetrating into the build material. The limited diffusivity of these colorants may be contributing to the lack of color in build material particles that are partially fused. As a result of the limited diffusivity of some colorants, the edge or surface of the 3D object may appear to have a pattern. The pattern may include areas of color and areas of white, which may be on an undesirable cosmetic effect. As an example, the pattern of colored and white areas may resemble a wood grain-like pattern.

The detailing agent disclosed herein may reduce or prevent these undesirable cosmetic effects. The colorant in the detailing agent has a relatively small particle size and a relatively high diffusivity. With its high diffusivity, the colorant in the detailing agent is capable of penetrating deep into the build material. As an example, the colorant disclosed herein is capable of penetrating up to 100 µm of a build material particle, whereas typical fusing agent colorants penetrate less than 10 µm of a build material particle. In some examples, the colorant in the detailing agent diffuses into build material particles at the edge boundary. The colorant dyes these build material particles. As such, even if the dyed build material particles are partially fused, and thus partially removed after 3D object formation, the remaining portion of the build material particles at the 3D object edge exhibit a color that matches the color of the fusing agent used, and not the color of the build material (e.g., white). In turn then, the colorant incorporated into the detailing agent reduces or prevents the formation of the pattern, and thus improves the overall color uniformity of the 3D object. Therefore, 3D objects that are formed with examples of the detailing agent disclosed herein have improved aesthetics when compared to 3D objects without the detailing agent.

An example of the 3D printing method 100 is depicted in FIG. 1. It is to be understood that the method 100 shown in FIG. 1 will be discussed in detail herein, and in some instances, FIGS. 2A through 2F and FIG. 3 will be discussed in conjunction with FIG. 1.

As shown at reference numeral 102, the method 100 includes applying a build material. An example of the application of the build material is shown in cross-section at FIG. 2A. In the example shown in FIG. 2A, one layer 10 of the build material 16 has been deposited, as will be discussed in more detail below.

The build material 16 may be a powder, a liquid, a paste, or a gel. Examples of build material 16 include semi-crystalline thermoplastic materials with a wide processing window of greater than 5° C. (i.e., the temperature range between the melting point and the re-crystallization temperature). Some specific examples of the build material 16 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the build material 16 include polyethylene, polyethylene terephthalate (PET), and an amorphous variation of these materials. Still other examples of suitable build materials 16 include polystyrene, polyacetals, polypropylene, polycarbonate, polyester, thermal polyurethanes, other engineering plastics, and blends of any two or more of the polymers listed herein. Core shell polymer particles of these materials may also be used.

The build material 16 may have a melting point ranging from about 50° C. to about 400° C. As examples, polyamide 12 having a melting point of 180° C. may be used, or thermal polyurethanes having a melting point ranging from about 100° C. to about 165° C. may be used.

The build material 16 may be made up of similarly sized particles or differently sized particles. In the examples shown herein, the build material 16 includes particles of two different sizes. The term "size", as used herein, refers to the diameter of a spherical particle, or the average diameter of a non-spherical particle (i.e., the average of multiple diameters across the particle). In an example, the average size of the particles of the build material 16 ranges from 5 µm to about 100 µm.

It is to be understood that build material 16 may include, in addition to polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 16.

Flow aid(s) may be added to improve the coating flowability of the build material 16. Flow aid(s) may be particularly desirable when the particles of the build material 16 are less than 25 µm in size. The flow aid improves the flowability of the build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminium silicate (E555), calcium aluminosilicate (E556), bentonite (E558), aluminium silicate (E559), stearic acid (E570), or polydimethylsiloxane (E900). In an example, the flow aid is added in an amount ranging from greater than 0 wt % to less than 5 wt % based upon the total wt % of the build material 16.

Figure 2A:
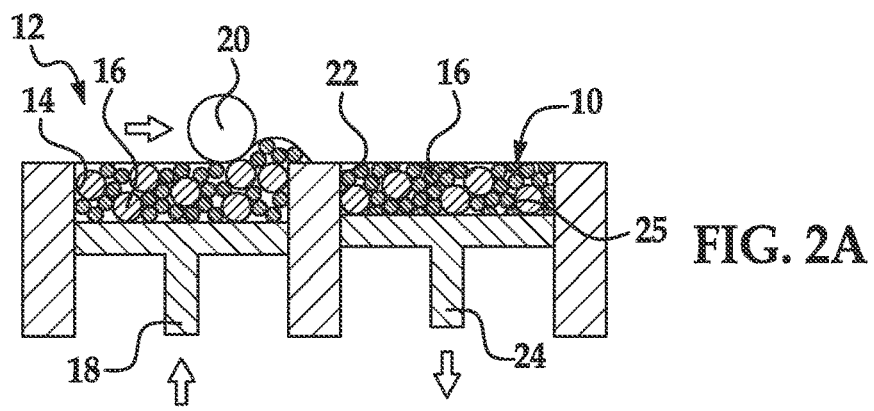
FIGS. 2A through 2F are cross-sectional views depicting the formation of layer(s) of a 3D object using an example of the 3D printing method disclosed herein.

In the example shown in FIG. 2A, a printing system 12 for forming the 3D object includes a supply bed 14 (including a supply of the build material 16), a delivery piston 18, a roller 20, a fabrication bed 22 (having a contact surface 25), and a fabrication piston 24. Each of these physical elements may be operatively connected to a central processing unit (not shown) of the printing system 12. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object. The data for the selective delivery of the build material 16, the fusing agent, etc. may be derived from a model of the 3D object to be formed.

The delivery piston 18 and the fabrication piston 24 may be the same type of piston, but are programmed to move in opposite directions. In an example, when a first layer of the 3D object is to be formed, the delivery piston 18 may be programmed to push a predetermined amount of the build material 16 out of the opening in the supply bed 14 and the fabrication piston 24 may be programmed to move in the opposite direction of the delivery piston 18 in order to increase the depth of the fabrication bed 22. The delivery piston 18 will advance enough so that when the roller 20 pushes the build material 16 into the fabrication bed 22 and onto the contact surface 25, the depth of the fabrication bed 22 is sufficient so that a layer 10 of the build material 16 may be formed in the bed 22. The roller 20 is capable of spreading the build material 16 into the fabrication bed 22 to form the layer 10, which is relatively uniform in thickness. In an example, the thickness of the layer 10 ranges from about 90 µm to about 110 µm, although thinner or thicker layers may also be used. For example, the thickness of the layer 10 may range from about 50 µm to about 200 µm.

It is to be understood that the roller 20 may be replaced by other tools, such as a blade that may be desirable for spreading different types of powders, or a combination of a roller and a blade.

Figure 2B:
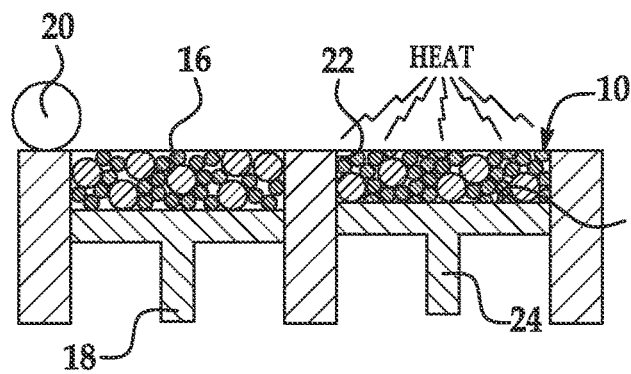

After the layer 10 of the build material 16 is deposited in the fabrication bed 22, the layer 10 is exposed to heating (as shown at reference number 104 in FIG. 1 and in FIG. 2B). Heating is performed to pre-heat the build material 16, and thus it is desirable that the heating temperature be below the melting point of the build material 16. As such, the temperature selected will depend upon the build material 16 that is used. As examples, the heating temperature may be from about 5° C. to about 50° C. below the melting point of the build material 16. In an example, the heating temperature ranges from about 50° C. to about 400° C. In another example, the heating temperature ranges from about 150° C. to about 170° C.

Pre-heating the layer 10 of the build material 16 may be accomplished using any suitable heat source that exposes all of the build material 16 in the fabrication bed 22 to the heat. Examples of the heat source include a thermal heat source or an electromagnetic radiation source (e.g., infrared (IR), microwave, etc.).

Figure 2C:
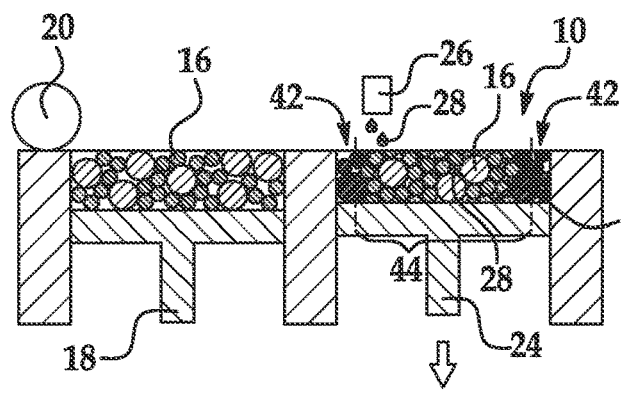

After pre-heating the layer 10, the fusing agent is selectively applied on a portion of the build material 16 in the layer 10, as shown at reference number 106 in FIG. 1 and in FIG. 2C. As illustrated in FIG. 2C, the fusing agent 28 may be dispensed from an inkjet printhead 26. While a single printhead is shown in FIG. 2C, it is to be understood that multiple printheads may be used that span the width of the fabrication bed 22. The printhead 26 may be attached to a moving XY stage or a translational carriage (neither of which is shown) that moves the printhead 26 adjacent to the fabrication bed 22 in order to deposit the fusing agent 28 in desirable area(s).

The printhead 26 may be programmed to receive commands from the central processing unit and to deposit the fusing agent 28 according to a pattern of a cross-section for the layer of the 3D object that is to be formed. As used herein, the cross-section of the layer of the object to be formed refers to the cross-section that is parallel to the contact surface 25. In the example shown in FIG. 2C, the printhead 26 selectively applies the fusing agent 28 on those portion(s) of the layer 10 that are to be fused to become the first layer of the 3D object. As an example, if the first layer is to be shaped like a cube or cylinder, the fusing agent 28 will be deposited in a square pattern or a circular pattern (from a top view), respectively, on at least a portion of the layer 10 of the build material 16. In the example shown in FIG. 2C, the fusing agent 28 is deposited in a square pattern on the portion 44 of the layer 10 and not on the portions 42.

Examples of suitable fusing agents 28 are water-based dispersions including a radiation absorbing binding agent (i.e., an active material). The active material may be near infrared light absorber. As examples, the active material may be any near IR dye or pigment. The dye or pigment in the fusing agent 28 may be any color. As one example, the fusing agent 28 may be an ink-type formulation including carbon black as the active material. An example of this ink-type formulation is commercially known as CM997A available from Hewlett-Packard Company. Examples of other pigment based inks include the commercially available inks CM993A and CE042A, available from Hewlett-Packard Company.

The aqueous nature of the fusing agent 28 enables the fusing agent 28 to penetrate, at least partially, into the layer 10 of the build material 16. The build material 16 may be hydrophobic, and the presence of a co-solvent and/or a surfactant in the fusing agent 28 may assist in obtaining desirable wetting behavior.

It is to be understood that a single fusing agent 28 may be selectively applied to form the layer of the 3D object, or multiple fusing agents 28 may be selectively applied to form the layer of the 3D object.

Figure 2D:
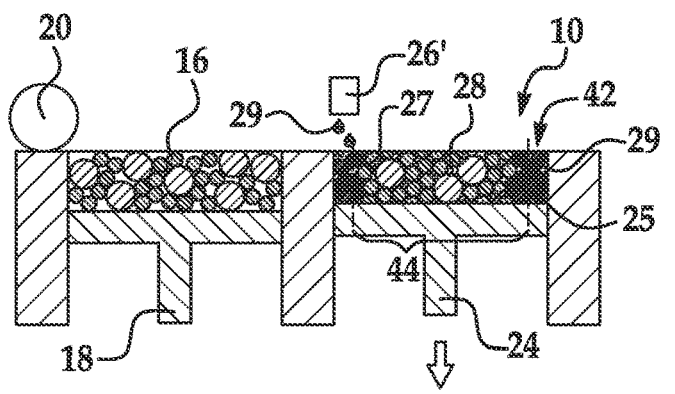
Figure 2E:
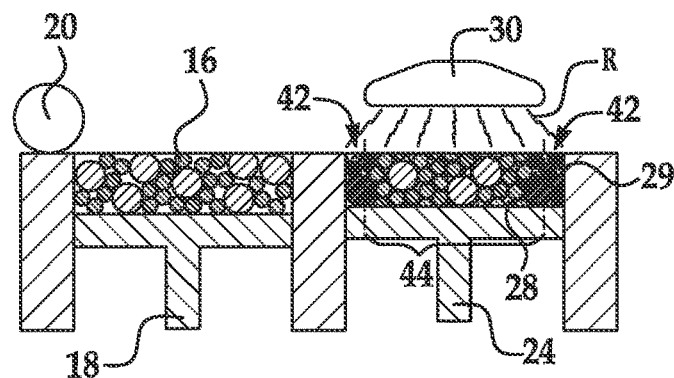

After the fusing agent 28 is/are selectively applied on the desired portion(s) 44, the detailing agent may be selectively applied on the same and/or on different portion(s) of the build material 16, the latter of which is shown at reference numeral 108 in FIG. 1. An example of the selective application of the detailing agent is schematically shown in FIG. 2D, where reference numeral 29 represents the detailing agent and reference numeral 42 represents the portions of the build material 16 to which the detailing agent 29 is selectively applied.

The detailing agent 29 includes a colorant, a surfactant, a co-solvent, and a balance of water. In some examples, the detailing agent 29 consists of these components, and no other components. In some instances, the detailing agent 29 excludes specific components, such as additional colorants (e.g., pigment(s)). In some other examples, the detailing agent 29 further includes an anti-kogation agent, a biocide, or combinations thereof. It has been found that this particular combination of components effectively reduces or prevents coalescence bleed. In addition, the detailing agent 29 prevents or reduces undesirable cosmetic effects (e.g., color and white patterns) by adding the colorant, which diffuses into and dyes the build material particles 16 at least at the edge boundary.

The colorant in the detailing agent 29 may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye is also capable of absorbing radiation with wavelengths of 650 nm or less. As such, the dye in the detailing agent 29 absorbs at least some wavelengths within the visible spectrum, but absorbs little or no wavelengths within the near-infrared spectra. This is in contrast to the active material in the fusing agent 28, which absorbs wavelengths within the near-infrared spectra. As such, the colorant in the detailing agent 29 will not substantially absorb the fusing radiation, and thus will not initiate melting and fusing of the build material 16 in contact therewith when the layer 10 is exposed to the fusing radiation.

The dye selected as the colorant in the detailing agent 29 also has a high diffusivity (i.e., penetrates into greater than 10 µm and up to 100 µm of the build material particle 16). The high diffusivity enables the dye to penetrate into the build material particles 16 upon which the detailing agent 29 is applied, and also enables the dye to spread into portions/ areas 44 of the build material 16 that are adjacent to the portions/areas 42 of the build material upon which the detailing agent 29 is applied. The dye penetrates deep into the build material particles 16 to dye/color the particles 16. When the detailing agent 29 is applied at or just outside the edge boundary, the build material particles 16 at the edge boundary may be colored. At least some of these dyed build material particles 16 are present at the edge(s) or surface(s) of the formed 3D layer or object, which prevents or reduces any patterns from forming at the edge(s) or surface(s).

The dye in the detailing agent 29 may be selected so that its color matches the color of the colorant in the fusing agent 28. As examples, the dye may be any azo dye having sodium or potassium counter ion(s) or any diazo (i.e., double azo) dye having sodium or potassium counter ion(s), where the color of azo or dye azo dye matches the color of the fusing agent 28.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

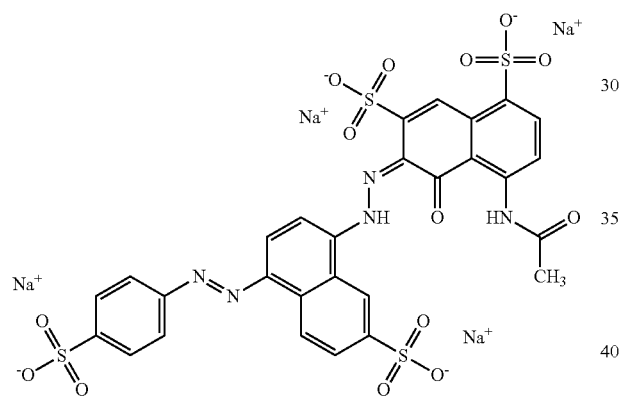

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

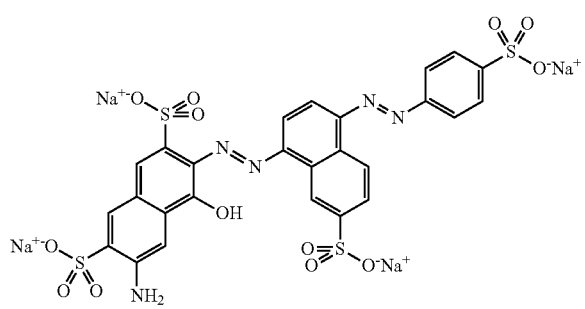

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

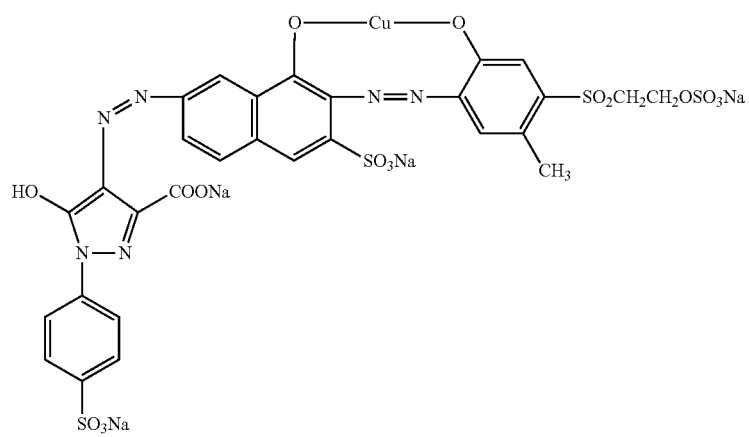

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

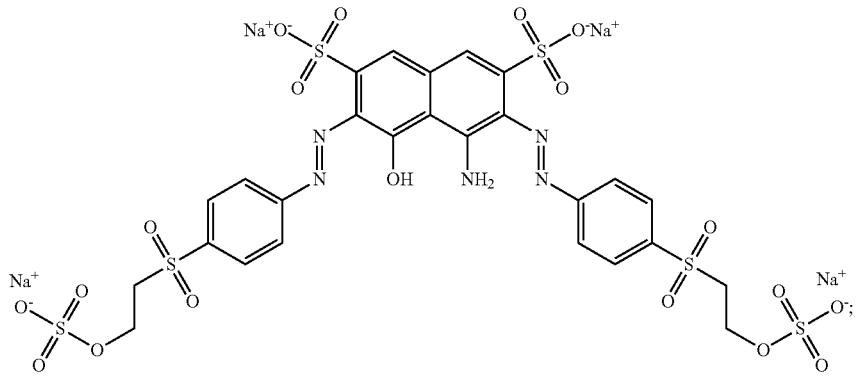

and combinations thereof. Some other commercially available examples of the dye used in the detailing agent 29 include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent 29 may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D object.

Some examples of the other dye include a salt, such as a sodium salt, an ammonium salt, or a potassium salt. Some specific examples include ethyl-[4-[[4-[ethyl-[(3-sulfophenyl)methyl]amino]phenyl]-(2-sulfophenyl)ethylidene]-1-cyclohexa-2,5-dienylidene]-[(3-sulfophenyl)methyl]azanium with a chemical structure of:

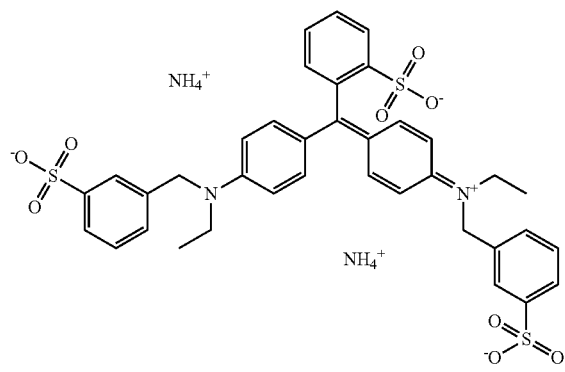

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

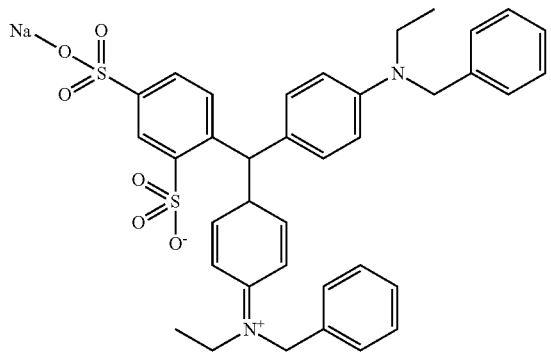

(commercially available as Acid Blue 7); and a phthalocyanine with a chemical structure of:

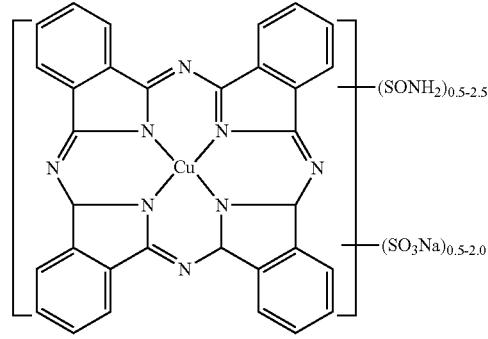

(commercially available as Direct Blue 199); and combinations thereof.

In an example of the detailing agent 29, the dye may be present in an amount ranging from about 1.00 wt % to about 3.00 wt % based on the total weight of the detailing agent 29. In another example of the detailing agent including a combination of dyes, one dye (e.g., the black dye) is present in an amount ranging from about 1.50 wt % to about 1.75 wt % based on the total weight of the detailing agent 29, and the other dye (e.g., the cyan dye) is present in an amount ranging from about 0.25 wt % to about 0.50 wt % based on the total weight of the detailing agent 29.

The detailing agent 29 also includes the surfactant to provide wetting properties when applied to the build material 16. In an example, the surfactant may be any surfactant that has a hydrophilic-lipophilic balance (HLB) of less than 10. The surfactant may range from about 0.10 wt % to about 5.00 wt % with respect to the total weight of the detailing agent 29. Examples of suitable surfactants include a self-emulsifiable, nonionic wetting agent based on acetylenic diol chemistry (e.g., SURFYNOL® SEF from Air Products and Chemicals, Inc.), a nonionic, acetylenic diol surface active agent (e.g., SURFYNOL® 104 from Air Products and Chemicals, Inc.), a nonionic fluorosurfactant (e.g., CAPSTONE® fluorosurfactants from DuPont, previously known as ZONYL FSO), a secondary alcohol ethoxylate, nonionic surfactant (e.g., TERGITOL™ 15-S-9, TERGITOL™ 15-S-7, TERGITOL™ 15-S-5, each of which is available from The Dow Chemical Co.), a nonionic, ethoxylated low-foam wetting agent (e.g., SURFYNOL® 440 from Air Products and Chemicals, Inc.), an ethoxylated wetting agent and molecular defoamer (e.g., SURFYNOL® 420 from Air Products and Chemicals, Inc.), an alkoxylated alcohol (e.g., TEGO® Wet 510 from Evonik Industries AG), and combinations thereof.

The detailing agent 29 also includes the co-solvent. The co-solvent is present in an amount ranging from about 1.00 wt % to about 20.00 wt % based on the total weight of the detailing agent 29. Some examples of suitable co-solvents include tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl-2-pyrrolidinone, 2-pyrrolidinone, 1,6-hexanediol, and combinations thereof.

As noted above, the detailing agent 29 may also include the anti-kogation agent and/or a biocide. Examples of anti-kogation agents include oleth-3-phosphate (e.g., CRODAFOS® N3 Acid from Croda) and a metal chelator, such as methylglycinediacetic acid (e.g., TRILON® M from BASF Corp.). Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). When included, the anti-kogation agent may be present in an amount ranging from about 0.10 wt % to about 2.00 wt %, and the biocide may be present in an amount ranging from about 0.01 wt % to about 0.20 wt %, each of which is with respect to the total weight of the detailing agent 29.

The balance of the detailing agent 29 is water. As such, the amount of water may vary depending upon the amounts of dye, surfactant, and co-solvent, and in some instances anti-kogation agent and/or biocide that are included.

The co-solvent and water of the detailing agent 29 provide evaporative cooling to the build material 16 in proximity thereof (e.g., in thermal contact therewith). It is believed that evaporation of 1.3 milligrams per $cm^2$ of the detailing agent 29 can remove up to 3 Joules of energy per $cm^2$ of the build material 16. This energy loss is enough to keep the build material 16 from heating and fusing at those portion(s)/area(s) (e.g., reference numeral 42) where the detailing agent 29 is applied.

The detailing agent 29 may be selectively applied in a manner similar to the fusing agent 28. In an example, the detailing agent 29 may be applied at the same time that the fusing agent 28 is dispensed, using a single pass or using multiple passes. In another example, the detailing agent 29 may be applied after the fusing agent 28 is dispensed.

As depicted in FIG. 2D, the detailing agent 29 may be dispensed from an inkjet printhead 26'. While a single printhead is shown in FIG. 2D, it is to be understood that multiple printheads may be used that span the width of the fabrication bed 22. The printhead 26' may be attached to a moving XY stage or a translational carriage (neither of which is shown) that moves the printhead 26' adjacent to the fabrication bed 22 in order to deposit the detailing agent 29 in desirable area(s). The printhead 26' may be programmed to receive commands from the central processing unit and to deposit the detailing agent 29 in the desired portion(s) 44 and/or 42.

In an example, it may be desirable to enhance, refine, smooth, etc. and dye the edge(s) of the layer of the 3D object that is being formed. In this example, the fusing agent 28 may be selectively applied according to the pattern of the cross-section (which is parallel to the contact surface 25) for the layer of the 3D object, and the detailing agent 29 may be selectively applied along at least part of an edge boundary 27 of that cross-section. An example of this is shown in FIG. 2D (side cross-sectional view of the system 12) and in FIG. 3 (top view of the build material 16 in the fabrication bed 22). In the example shown in these figures, the shape of the 3D object layer to be formed is a rectangular prism, and the pattern of the cross-section that is parallel to the contact surface 25 is a square or rectangle having edge boundary 27. The build material 16 within the edge boundary 27 is the portion 44 upon which the fusing agent 28 is selectively applied. The build material 16 positioned between the edge boundary 27 and the edges of the fabrication bed 22 is outside the pattern of the cross-section, and thus is the portion 42 upon which the detailing agent 29 is selectively applied. The portion 43 includes build material 16 within the portion 44 at or near the edge boundary 27. As such, the portion 43 is the outer edge of the 3D object layer to be formed where the colorant from the detailing agent 29 penetrates into and dyes the build material 16. It is to be understood that the portion 43 may be non-uniform as the dye may penetrate some build material particles 16 more than others.

Figure 4:
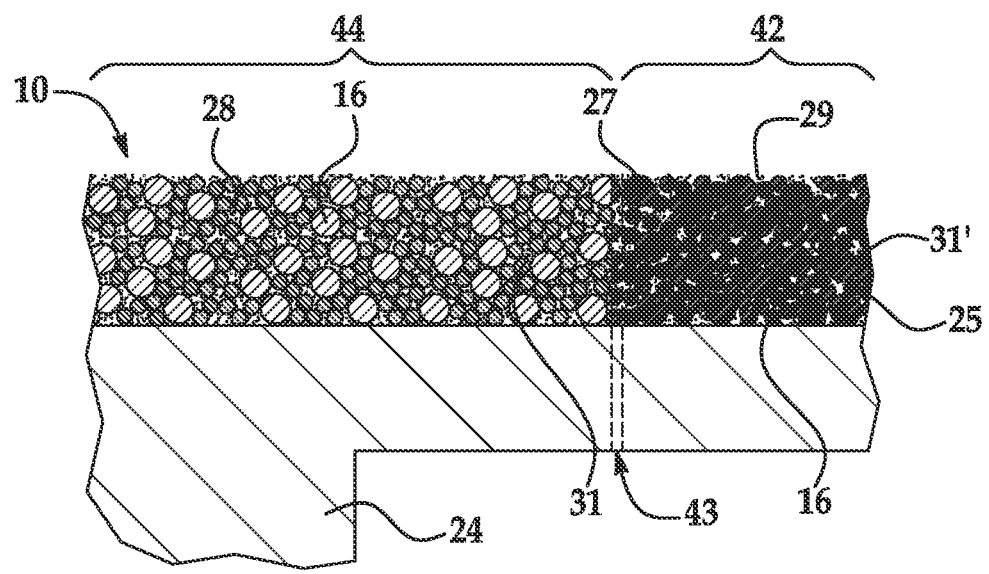
FIG. 4 is a side cross-sectional view taken along line 4-4 of FIG. 3.

Referring briefly to FIG. 4, a cross-section (along line 4-4 of FIG. 3) of the two portions 42 and 44 is depicted. It is to be understood that this cross-section is perpendicular to the contact surface 25 and is not the same as the cross-section of the pattern of the layer. The view in FIG. 4 illustrates some of the build material 16 on the contact surface 25 after the fusing agent 28 and detailing agent 29 are applied thereon. As depicted, the fusing agent 28 penetrates into at least some of the voids 31 between the particles of the build material 16 within the portion 44. Similarly, the detailing agent 29 penetrates into at least some of the voids 31' between the particles of the build material 16 within the portion 42 outside of the edge boundary 27 and also diffuses into the particles of the build material 16. In addition, the detailing agent 29 penetrates into the portion 43 (within the edge boundary 27) of the 3D object layer to be formed. In the example shown in FIGS. 2D, 3, and 4, the detailing agent 29 is capable of dying the build material 16 at the edge boundary 27 and preventing curing (fusing, sintering, etc.) of the portion 42 of the build material 16, while the fusing agent 28 is capable of enhancing curing (fusing, sintering, etc.) of the portion 44 of the build material 16.

In another example, it may be desirable to obtain different levels of curing/fusing/sintering within the layer of the 3D object that is being formed. Different levels of curing/fusing/sintering may be desirable to control internal stress distribution, warpage, mechanical strength performance, and/or elongation performance of the 3D object. In this example, the fusing agent 28 may be selectively applied according to the pattern of the cross-section (which is parallel to the contact surface 25) for the layer of the 3D object, and the detailing agent 29 may be selectively applied within at least a portion of that cross-section. As such, in some instances, the detailing agent 29 is applied to all or some of the portion 44 of the build material 16 upon which the fusing agent 28 is applied. Since the fusing agent 28 is present in the portion 44 with the detailing agent 29, curing is not completely prevented. It is to be understood that when the detailing agent 29 is applied within the same portion 44 as the fusing agent 28, the detailing agent 29 may be applied in any desirable pattern.

In still another example, it may be desirable to enhance, refine, smooth, etc. the edge(s) of the layer of the 3D object that is being formed and to obtain different levels of curing/fusing/sintering within the layer of the 3D object that is being formed. In this example, the fusing agent 28 may be selectively applied according to the pattern of the cross-section (which is parallel to the contact surface 25) for the layer of the 3D object, and the detailing agent 29 may be selectively applied along/outside of at least part of an edge boundary 27 of that cross-section (i.e., in portion 42) and may be selectively applied within at least a portion of that cross-section (i.e., in portion 44).

As the layers of the 3D object are built up in the Z-direction, uniformity or variations in curing/fusing/sintering may be achieved along the XY plane and/or along the Z axis. Substantially uniform curing/fusing/sintering may be achieved by applying the fusing agent 28 within the cross-section of the pattern for each layer and applying the detailing agent 29 outside of the edge boundary 27 of each layer at the same voxel density. In one example, variations in curing/fusing/sintering within the cross-section of the layers may be achieved by applying the fusing agent 28 at the same voxel density in each layer, and also applying the detailing agent 29 throughout the cross-sections of each of the respective layers at different voxel densities. As an example, if it is desirable that level of curing/fusing/sintering decrease from layer to layer along the Z axis, the voxel density of the detailing agent 29 deposited within the respective cross-sections may be the lowest in the first layer and may be increased in subsequently formed layers.

Additionally, as the layers of the 3D object are built up in the Z-direction, detailing agent 29 may be applied to previously formed layers. In instances when the detailing agent 29 is applied at and outside of the edge boundary 27 during layer formation, the top and/or bottom of the resulting layer (which is exposed to fusing agent 28 but not detailing agent 29) may appear, at least in part, to have the color of the build material. These surface(s) may be visible in the final part, and thus it may be desirable to dye these surface(s) during subsequent layer formation. For example, in the 3D object 40 shown in FIG. 5, each of the layers has a top surface that is visible in the final part, but may not be exposed to detailing agent 29 during formation. It may be desirable to dye each of these surfaces as the next layer is formed. As an example, the detailing agent 29 may be applied to the exposed (e.g., top) surfaces of layer 32 while layer 34 is being built. It is to be understood that the detailing agent 29 may be applied directly to the exposed surface, or may be applied to and penetrate through build material that is positioned on the exposed surface while the next layer is being formed.

After the fusing agent 28 and the detailing agent 29 are selectively applied in the desired portions 44 and/or 42, the entire layer 10 of the build material 16 is exposed to radiation R. This is shown at reference numeral 110 of FIG. 1 and in FIG. 2E.

The radiation R is emitted from a radiation source 30, such as an IR or near-IR curing lamp, or IR or near-IR light emitting diodes (LED), or lasers with specific IR or near-IR wavelengths. The radiation source 30 used will depend, at least in part, on the type of fusing agent 28 that is used. The radiation source 30 may be attached, for example, to a carriage that also holds the printhead(s) 26, 26'. The carriage may move the radiation source 30 into a position that is adjacent to the fabrication bed 22. The radiation source 30 may be programmed to receive commands from the central processing unit and to expose the layer 10, including the fusing agent 28 and detailing agent 29, to radiation R. The length of time the radiation R is applied for, or energy exposure time, may be dependent, for example, on one or more of: characteristics of the radiation source 30; characteristics of the build material 16; and/or characteristics of the fusing agent 28.

The fusing agent 28 enhances the absorption of the radiation R, converts the absorbed radiation to thermal energy, and promotes the transfer of the thermal heat to the build material 16 in contact therewith (i.e., in the portion 44). In an example, the fusing agent 28 sufficiently elevates the temperature of the build material 16 in the portion 44 above the melting point(s), allowing curing (e.g., sintering, binding, fusing, etc.) of the particles to take place.

When the detailing agent 29 is applied with the fusing agent 28 in at least part of the portion(s) 44, different curing levels may be achieved. In this example, the presence of the detailing agent 29 may cause the fusing agent 28 to heat the build material 16 a temperature that is below its melting point but is suitable to cause softening and bonding of the particles.

Still further, it is to be understood that portions 42 of the build material that do not have the fusing agent 28 applied thereto but do have the detailing agent 29 applied thereto do not absorb, or absorb little, of the applied radiation R. Any energy that is absorbed by the detailing agent 29 is not emitted to the adjacent build material 16 due, in part, to the evaporate cooling that the detailing agent provides 29. As such, in these instances, the build material particles 16 within the portion(s) 42 generally do not exceed the melting point(s) of the build material particles 16 and do not fuse/cure.

Exposure to radiation R forms one layer 32 of the 3D object 40 (see FIG. 2F) to be formed.

Steps 102 through 110 of FIG. 1 (shown and described in reference to FIGS. 2A through 2F) may be repeated as many times as desirable to create subsequent layers 34, 36, 38 (FIG. 2F) and to ultimately form the 3D object 40. It is to be understood that heat absorbed during the application of energy from the portion 44 of the build material 16 on which fusing agent 28 has been delivered or has penetrated may propagate to a previously solidified layer, such as layer 32, causing at least some of that layer to heat up above its melting point. This effect helps create strong interlayer bonding between adjacent layers of the 3D object 40.

Figure 2F:
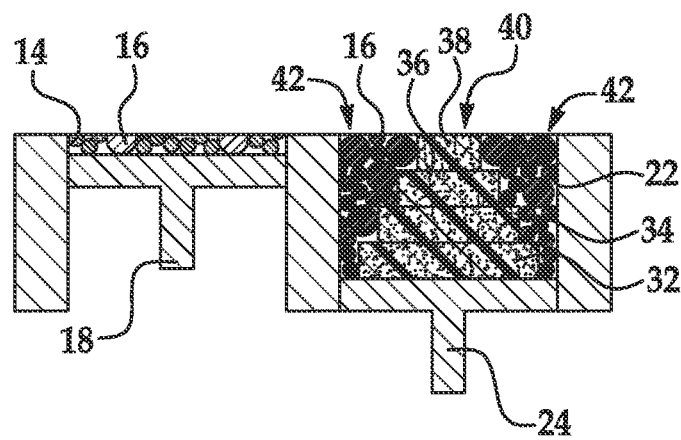
Figure 3:
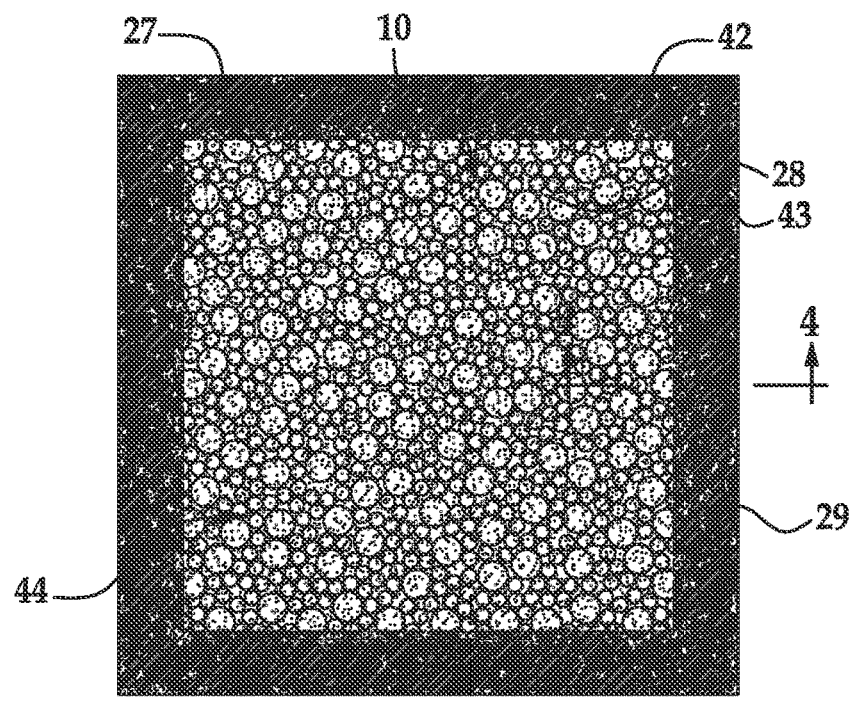
FIG. 3 is a top, schematic view of the build material of FIG. 2D, with a fusing agent applied on a portion thereof within a cross-section of the 3D object to be formed, and with a detailing agent applied on another portion thereof at an edge boundary.

FIG. 2F illustrates one example of the 3D object 40. It is to be understood, however, that the subsequently formed layers 34, 36, 38 may have any desirable shape and/or thickness and may be the same as or different from any other layer 32, 34, 36, 38 depending upon the size, shape, etc. of the 3D object 40 that is to be formed.

As illustrated in FIG. 2F, as subsequent layers 34, 36, 38 have been formed, the delivery piston 18 is pushed closer to the opening of the delivery bed 14, and the supply of the build material 16 in the delivery bed 14 is diminished (compared, for example, to FIG. 2A at the outset of the method). The fabrication piston 24 is pushed further away from the opening of the fabrication bed 22 in order to accommodate the subsequent layer(s) of build material 16, the selectively applied fusing agent 28, and the selectively applied detailing agent 29. Since at least some of the build material 16 remains uncured/unfused after each layer 32, 34, 36, 38 is formed, the 3D object 40 is at least partially surrounded by the uncured build material 16 and detailing agent 29 in the fabrication bed 22.

When the 3D object 40 is complete, it may be removed from the fabrication bed 22, and the remaining uncured/unfused build material 16 and detailing agent 29 may be separated from one another. In an example, a water treatment (e.g., dissolution of the detailing agent 29, filtration, etc.) may be used to remove the detailing agent 29 from the build material 16. The uncured build material 16 may be washed and then reused.

Figure 5:
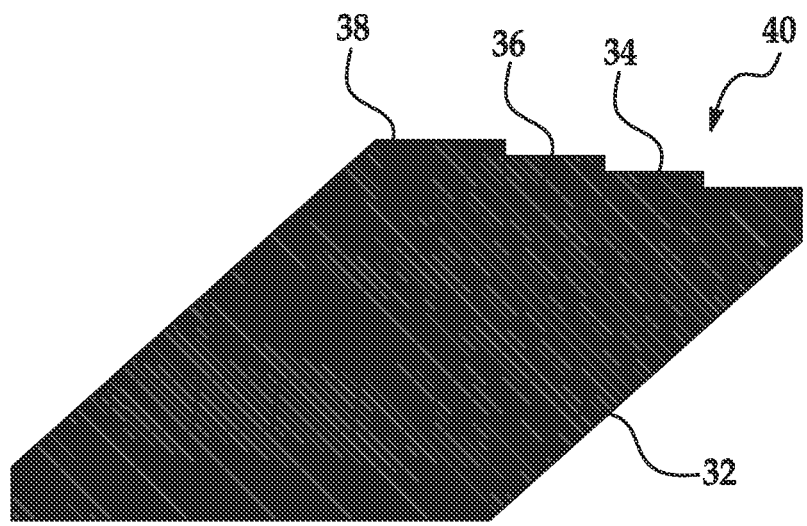
FIG. 5 is a perspective view of a 3D object formed by the method shown in FIGS. 2A through 2F.

FIG. 5 illustrates a perspective view of the example of the 3D object 40 formed by the method shown in FIGS. 2A through 2E. Each of the layers 32, 34, 36, 38 includes cured (sintered, fused, etc.) build material and the active material in the fusing agent 28 binding the cured build material. As depicted, at least the outer edges and surfaces of the 3D object 40 have been dyed with the colorant of the detailing agent 29.

Figure 6:
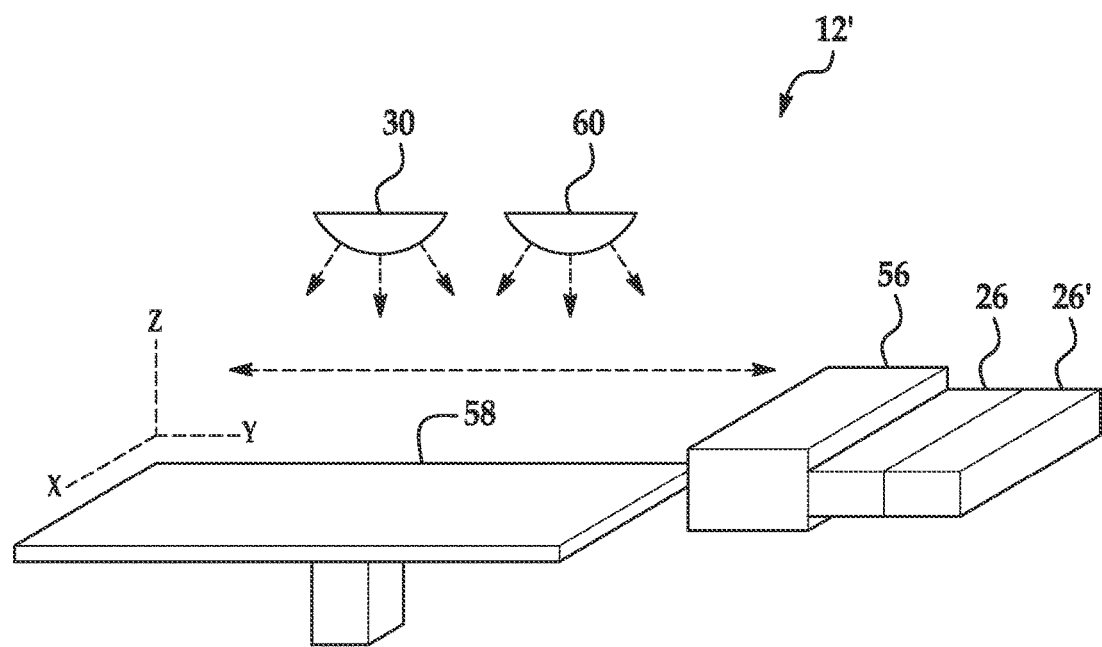
FIG. 6 is a simplified isometric view of an example of a 3D printing system that may be used in an example of the 3D printing method as described herein.
Figure 6:
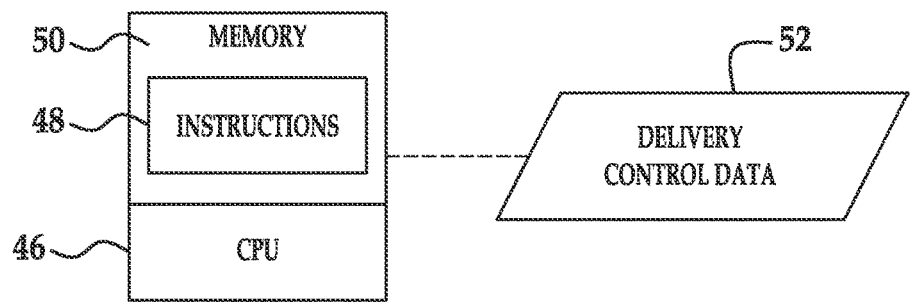

Referring now to FIG. 6, another example of the printing system 12' is depicted. The system 12' includes a central processing unit 46 that controls the general operation of the additive printing system 12'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 12' in accordance with the instructions 48.

In this example, the printing system 12' includes a fusing agent distributor 26 to selectively deliver fusing agent 28 to portion(s) 44 of the layer (not shown in this figure) of build material 16 provided on a support member 58. In this example, the printing system 12' also includes a detailing agent distributor 26' to selectively deliver the detailing agent 29 to other portion(s) 42 and/or the portion(s) 44 of the layer (not shown in this figure) of build material 16 provided on the support member 58.

The central processing unit 46 controls the selective delivery of the fusing agent 28 and the detailing agent 29 to the layer of the build material 16 in accordance with delivery control data 52.

In the example shown in FIG. 6, it is to be understood that the distributors 26, 26' are printheads, such as thermal printheads or piezoelectric inkjet printheads. The printheads 26, 26' may be drop-on-demand printheads or continuous drop printheads.

The printheads 26, 26' may be used to selectively deliver the fusing agent 28 and the detailing agent 29, respectively, when in the form of a suitable fluid. As described above, each of the fusing agent 28 and the detailing agent 29 includes an aqueous vehicle, such as water, co-solvent(s), surfactant(s), etc., to enable it to be delivered via the printheads 26, 26'.

In one example the printhead 26, 26' may be selected to deliver drops of the fusing agent 28 and the detailing agent 29 at a resolution ranging from about 300 dots per inch (DPI) to about 1200 DPI. In other examples, the printhead 26, 26' may be selected to be able to deliver drops of the fusing agent 28 and the detailing agent 29 at a higher or lower resolution. The drop velocity may range from about 5 m/s to about 24 m/s and the firing frequency may range from about 1 kHz to about 100 kHz.

Each printhead 26, 26' may include an array of nozzles through which the printhead 26, 26' is able to selectively eject drops of fluid. In one example, each drop may be in the order of about 10 pico liters (pl) per drop, although it is contemplated that a higher or lower drop size may be used. In some examples, printheads 26, 26' are able to deliver variable size drops.

The printheads 26, 26' may be an integral part of the printing system 12', or it may be user replaceable. When the printheads 26, 26' are user replaceable, they may be removably insertable into a suitable distributor receiver or interface module (not shown).

In another example of the printing system 12', a single inkjet printhead may be used to selectively deliver both the fusing agent 28 and the detailing agent 29. For example, a first set of printhead nozzles of the printhead may be configured to deliver the fusing agent 28, and a second set of printhead nozzles of the printhead may be configured to deliver the detailing agent 29.

As shown in FIG. 6, each of the distributors 26, 26' has a length that enables it to span the whole width of the support member 58 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 58. In other examples of the printing system 12', the distributors 26, 26' may have a shorter length that does not enable them to span the whole width of the support member 58.

While not shown in FIG. 6, it is to be understood that the distributors 26, 26' may be mounted on a moveable carriage to enable them to move bi-directionally across the length of the support member 58 along the illustrated y-axis. This enables selective delivery of the fusing agent 28 and the detailing agent 29 across the whole width and length of the support member 58 in a single pass. In other examples, the distributors 26, 26' may be fixed while the support member 58 is configured to move relative thereto.

As used herein, the term 'width' generally denotes the shortest dimension in the plane parallel to the X and Y axes shown in FIG. 6, and the term 'length' denotes the longest dimension in this plane. However, it is to be understood that in other examples the term 'width' may be interchangeable with the term 'length'. As an example, the distributors 26, 26' may have a length that enables it to span the whole length of the support member 58 while the moveable carriage may move bi-directionally across the width of the support member 58.

In examples in which the distributors 26, 26' have a shorter length that does not enable them to span the whole width of the support member 58, the distributors 26, 26' may also be movable bi-directionally across the width of the support member 58 in the illustrated X axis. This configuration enables selective delivery of the fusing agent 28 and the detailing agent 29 across the whole width and length of the support member 58 using multiple passes.

The distributors 26, 26' may respectively include therein a supply of the fusing agent 28 and the detailing agent 29, or may be respectively operatively connected to a separate supply of the fusing agent 28 and detailing agent 29.

As shown in FIG. 6, the printing system 12' also includes a build material distributor 56. This distributor 56 is used to provide the layer (e.g., layer 10) of the build material 16 on the support member 58. Suitable build material distributors 56 may include, for example, a wiper blade, a roller, or combinations thereof.

The build material 16 may be supplied to the build material distributor 56 from a hopper or other suitable delivery system. In the example shown, the build material distributor 56 moves across the length (Y axis) of the support member 58 to deposit a layer of the build material 16. As previously described, a first layer of build material 16 will be deposited on the support member 58, whereas subsequent layers of the build material 16 will be deposited on a previously deposited (and solidified) layer.

It is to be further understood that the support member 58 may also be moveable along the Z axis. In an example, the support member 58 is moved in the Z direction such that as new layers of build material 16 are deposited, a predetermined gap is maintained between the surface of the most recently formed layer and the lower surface of the distributors 26, 26'. In other examples, however, the support member 58 may be fixed along the Z axis and the distributors 26, 26' may be movable along the Z axis.

Similar to the system 12, the system 12' also includes the radiation source 30 to apply energy to the deposited layer of build material 16, the fusing agent 28, and the detailing agent 28 to cause the solidification of portion(s) 44 of the build material 16. Any of the previously described radiation sources 30 may be used. In an example, the radiation source 30 is a single energy source that is able to uniformly apply energy to the deposited materials, and in another example, radiation source 30 includes an array of energy sources to uniformly apply energy to the deposited materials.

In the examples disclosed herein, the radiation source 30 is configured to apply energy in a substantially uniform manner to the whole surface of the deposited build material 16. This type of radiation source 30 may be referred to as an unfocused energy source. Exposing the entire layer to energy simultaneously may help increase the speed at which a three-dimensional object may be generated.

While not shown, it is to be understood that the radiation source 30 may be mounted on the moveable carriage or may be in a fixed position.

The central processing unit 46 may control the radiation source 30. The amount of energy applied may be in accordance with delivery control data 52.

The system 12' may also include a pre-heater 60 that is used to pre-heat the deposited build material 16 (as shown and described in reference to FIG. 2B). The use of the pre-heater 60 may help reduce the amount of energy that has to be applied by the radiation source 30.

To further illustrate the present disclosure, examples are given herein. It is to be understood that these examples are provided for illustrative purposes and are not to be construed as limiting the scope of the present disclosure.

EXAMPLE 1

A layer of polyamide-12 (PA-12) build material was applied to a fabrication bed. A carbon black ink was used as the fusing agent. An example of the detailing agent disclosed herein was used, and included 2.00 wt % Reactive Black 31, 16.00 wt % tripropylene glycol methyl ether, 0.85 wt % SURFYNOL® SEF, 0.05 wt % CAPSTONE® FS-35, 0.30 wt % CRODAFOS® N3 Acid, 0.18 wt % PROXEL® GXL, 0.14 wt % KORDEX® MLX, and a balance of water. The fusing agent was thermal inkjet printed with a 9 ng printhead in a pattern on a portion of the PA-12 layer, and the detailing agent was thermal inkjet printed with a 9 ng printhead on another portion of the PA-12 layer outside the edges of the pattern.

A comparative example was prepared by selectively depositing the fusing agent without the detailing agent. In addition, a half comparative example, half example 3D object was prepared. The half comparative example, half example 3D object had half of the layers formed without the detailing agent, and the other half of the layers formed with the detailing agent.

Figure 7:
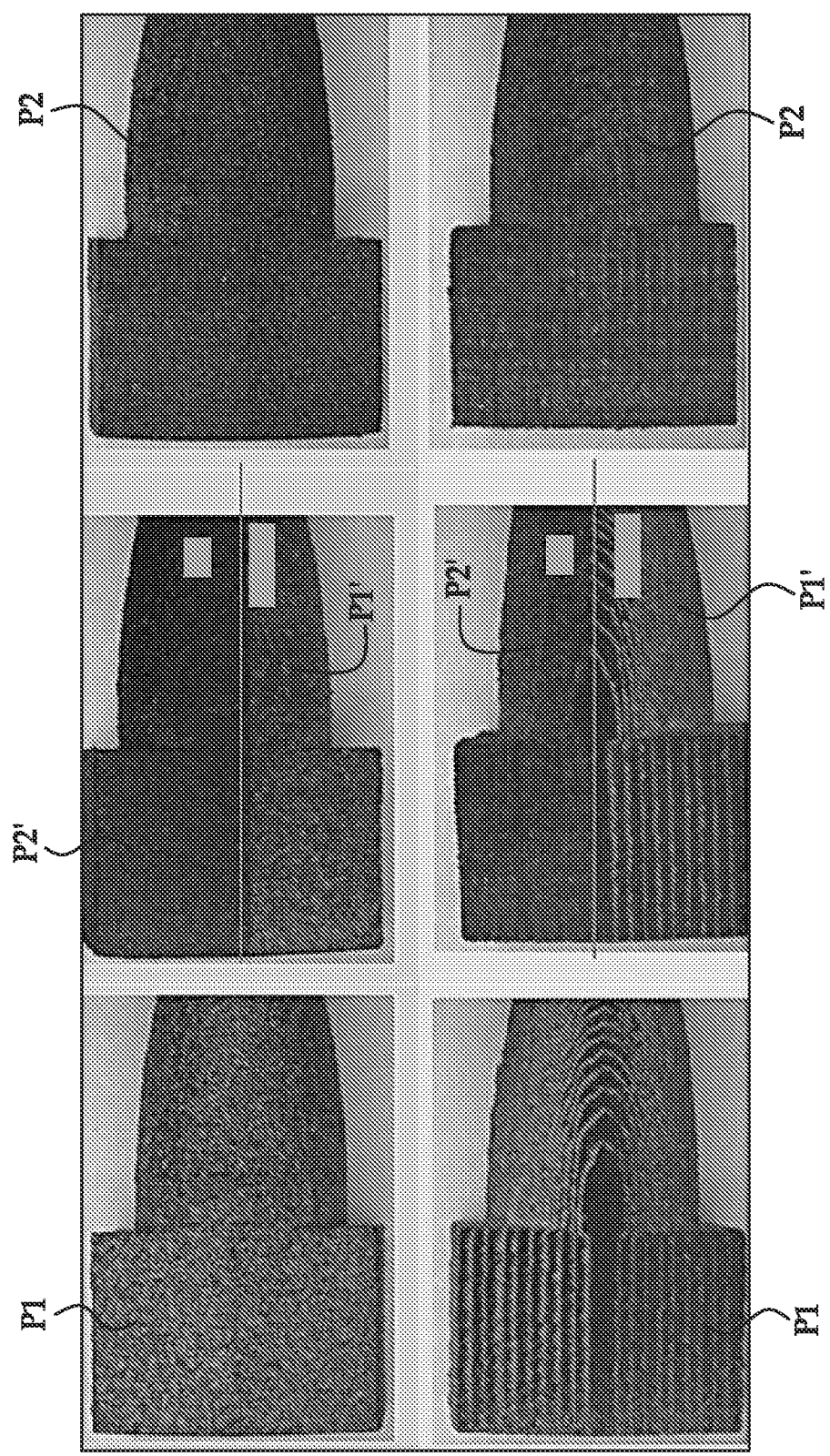
FIG. 7 includes micrographs of a comparative example of a 3D object formed with no detailing agent, an example of a 3D object formed with an example of the detailing agent disclosed herein applied on one half of the 3D object, and an example of a 3D object formed with the detailing agent applied to the entire 3D object.

Optical microscope images, taken along two different print directions, of the comparative 3D object, the half comparative example, half example 3D object, and the example 3D object are shown in FIG. 7. One set of images was taken along the z-print direction (the images shown in the top row of FIG. 7) and the other set of images was taken along the x,y-print direction (the images shown in the bottom row of FIG. 7). The comparative 3D object that did not include any detailing agent in any layer is labeled "P1". The layers of the half comparative example, half example 3D object that do not include detailing agent are labeled "P1'". The layers of the half comparative example, half example 3D object that do include detailing agent are labeled "P2'". The example 3D object that includes the detailing agent in every layer of the 3D object is labeled "P2".

As shown in FIG. 7, the layers with no detailing agent contain a wood grain-like cosmetic effect. It is believed this is due, at least in part, to the carbon black having a relatively low diffusivity into the build material. As a result, the carbon black does not penetrate into the build material particles, and thus does not color the interior of the build material particles. As such, when portions of unfused build material particles at the edge boundary are removed, the color that is exposed is that of the white build material.

Also as shown in FIG. 7, the layers that include the example of the detailing agent have either no wood grain-like cosmetic effect or a significantly reduced wood grain-like cosmetic effect. It is believed that this is due, in part, to the dye having a higher diffusivity into the build material. When the detailing agent (including the dye) was added outside the pattern of build material containing the fusing agent, the dye penetrated deeper into the build material upon which it was applied as well as into the adjacent build material in within the pattern. As such, the dye added color to the edge boundary of the 3D object, thereby eliminating or reducing the wood grain-like cosmetic effect.

EXAMPLE 2

A layer of polyamide-12 (PA-12) build material was applied to a fabrication bed. A carbon black ink was used as the fusing agent. A first example of the detailing agent disclosed herein was used, and had the same composition as disclosed above for the detailing agent used in example 1. A second example of the detailing agent was also used, and included 1.75 wt % Reactive Black 31, 0.50 wt % Acid Blue 9, 16.00 wt % tripropylene glycol methyl ether, 0.85 wt % SURFYNOL® SEF, 0.05 wt % CAPSTONE® FS-35, 0.30 wt % CRODAFOS® N3 Acid, 0.18 wt % PROXEL® GXL, 0.14 wt % KORDEX® MLX, and a balance of water.

The fusing agent was thermal inkjet printed on a portion of the PA-12 layer with a 9 ng printhead in a pattern that included a 4 mm hole in one example, a 3 mm hole in another example, and a 2 mm hole in yet another example. The holes did not have fusing agent applied thereon. The detailing agents were thermal inkjet printed with a 9 ng printhead on another portion of the PA-12 layer where the 4 mm hole, 3 mm hole, and 2 mm hole were to be formed. As a result, the 3D objects that were formed included an ~4 mm hole, ~3 mm hole, and ~2 mm hole, respectively. The accuracy of the formation of the 3D objects was measured by measuring the diameters of the hole in each 3D object.

Comparative examples were prepared by selectively depositing the fusing agent in similar patterns to form the 4 mm hole, the 3 mm hole, and the 2 mm hole, and selectively applying a comparative detailing agent on another portion of the PA-12 layer where the 4 mm hole, 3 mm hole, and 2 mm hole were to be formed. The comparative detailing agent had the same composition as the first example detailing agent (described above) without any dye. The comparative examples were prepared in the same manner as the examples listed above, except that the comparative detailing agent was applied where the holes were to be formed. Therefore, a hole was also formed in each of the comparative 3D objects. The diameter of these holes was also measured to determine the accuracy of the formation of the comparative 3D object.

It is to be understood that a comparative 3D object was formed along with each of the example 3D objects. The following table (Table 1) illustrates the labels for the 3D objects and the comparative 3D objects that were formed for comparison with the respective 3D objects, and the number of the respective objects that were made.

TABLE 1

| 3D object (detailing agent (DA) used) | Target Hole Diameter (mm) | # made | Comparative 3D object (made with comp. DA) | Target Hole Diameter (mm) | # made |
|---|---|---|---|---|---|
| 4A (first example DA) | 4 | 4 | C1 | 4 | 4 |
| 4B (second example DA) | 4 | 5 | C2 | 4 | 5 |
| 3A (first example DA) | 3 | 3 | C3 | 3 | 3 |
| 3B (second example DA) | 3 | 5 | C4 | 3 | 5 |
| 2A (first example DA) | 2 | 2 | C5 | 2 | 2 |
| 2B (second example DA) | 2 | 3 | C6 | 2 | 3 |

After fusing and unfused build material removal, the diameter of the holes that were formed in each 3D object and comparative 3D objected were measured to determine the accuracy of the formation of the comparative 3D object. The results are shown in Tables 2-4. Tables 2-4 also depict the average diameter for the objects, as well as the % change in diameter between the 3D objects and the comparative 3D objects.

TABLE 2

Diameters of Holes in Objects with Target Hole Diameter of 4 mm

| Object Number | Diameter (mm) of Comp. 3D Object C1 | Diameter (mm) of 3D Object 4A | Diameter (mm) of Comp. 3D Object C2 | Diameter (mm) of 3D Object 4B |
|---|---|---|---|---|
| 1 | 3.92 | 3.8 | 3.75 | 3.66 |
| 2 | 3.89 | 3.81 | 3.72 | 3.64 |
| 3 | 3.85 | 3.8 | 3.74 | 3.56 |
| 4 | 3.98 | 3.88 | 3.8 | 3.66 |
| 5 | none | none | 3.75 | 3.74 |
| Avg. 4 mm | 3.91 | 3.82 | 3.75 | 3.65 |
| % Change 4 mm | −2.2 | | −2.7 | |

Figure 8A:
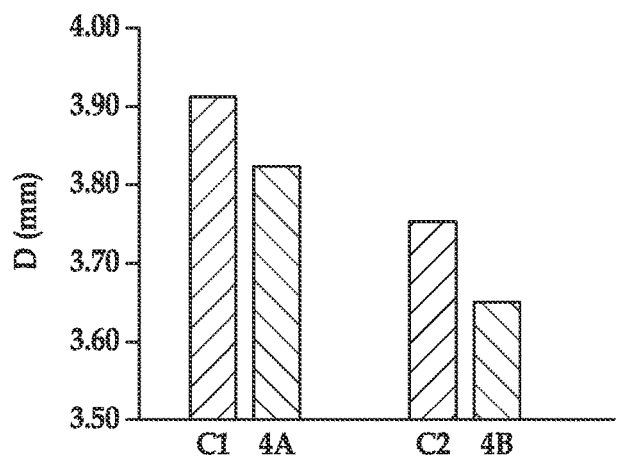
FIGS. 8A-8C are bar graphs depicting the average diameter (after fusing) of, respectively, 4 mm, 3 mm, and 2 mm holes constructed into comparative examples of a 3D object formed with a comparative detailing agent and examples of the 3D object formed with two different examples of the detailing agent disclosed herein.

As shown in Table 2, the average diameter for the 3D objects 4A was slightly smaller (0.09 mm) than the average diameter for the 3D comparative objects C1; and the average diameter for the 3D objects 4B was also slightly smaller (0.1 mm) than the average diameter for the 3D comparative objects C2. FIG. 8A is a bar graph depicting the average diameter results for the objects formed with target 4 mm holes, with the average diameter in millimeters located on the Y-axis (labeled "D (mm)").

TABLE 3

Diameters of Holes in Objects with Target Hole Diameter of 3 mm

| Object Number | Diameter (mm) of Comp. 3D Object C3 | Diameter (mm) of 3D Object 3A | Diameter (mm) of Comp. 3D Object C4 | Diameter (mm) of 3D Object 3B |
|---|---|---|---|---|
| 1 (hole in XY plane) | 2.87 | none | 2.72 | none |
| 2 (hole in XY plane) | 2.84 | 2.83 | 2.71 | 2.55 |
| 3 (hole in XY plane) | none | 2.81 | 2.75 | 2.65 |
| 4 (hole in XY plane) | none | none | none | 2.64 |
| 5 (hole in Z plane) | none | none | 2.77 | 2.77 |
| Avg. 3 mm | 2.86 | 2.82 | 2.74 | 2.65 |
| % Change 3 mm | −1.2 | | −3.1 | |

As shown in Table 3, the average diameter for the 3D objects 3A was slightly smaller (0.04 mm) than the average diameter for the 3D comparative objects C3; and the average diameter for the 3D objects 3B was also slightly smaller (0.09 mm) than the average diameter for the 3D comparative objects C4.

Figure 8B:
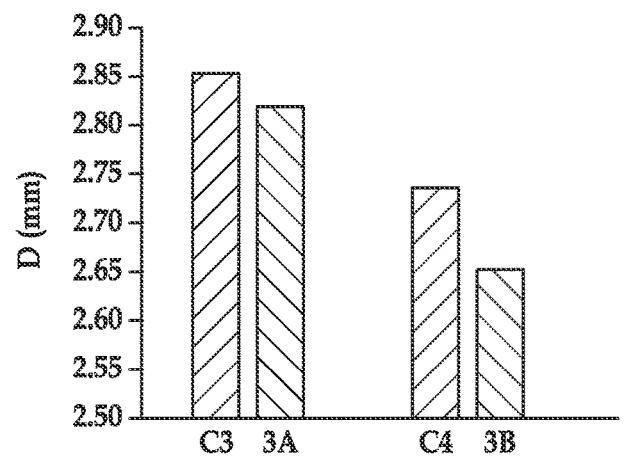

FIG. 8B is a bar graph depicting the average diameter results for the objects formed with target 3 mm holes, with the average diameter in millimeters located on the Y-axis (labeled "D (mm)").

TABLE 4

Diameters of Holes in Objects with Target Hole Diameter of 2 mm

| Object Number | Diameter (mm) of Comp. 3D Object C5 | Diameter (mm) of 3D Object 2A | Diameter (mm) of Comp. 3D Object C6 | Diameter (mm) of 3D Object 2B |
|---|---|---|---|---|
| 1 | 1.78 | 1.75 | 1.68 | 1.42 |
| 2 | 1.81 | 1.73 | 1.59 | 1.46 |
| 3 | none | none | 1.76 | 1.8 |
| Avg. 2 mm | 1.8 | 1.74 | 1.68 | 1.56 |
| % Change 2 mm | −3.3 | | −7 | |

As shown in Table 4, the average diameter for the 3D objects 2A was slightly smaller (0.06 mm) than the average diameter for the 3D comparative objects C5; and the average diameter for the 3D objects 2B was also slightly smaller (0.12 mm) than the average diameter for the 3D comparative objects C6.

Figure 8C:
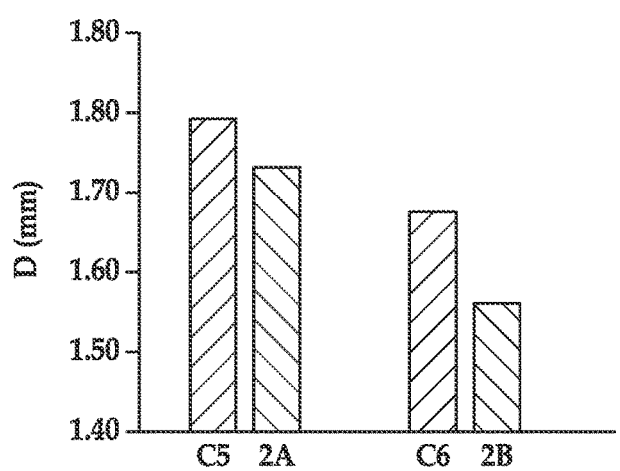

FIG. 8C is a bar graph depicting the average diameter results for the objects formed with target 2 mm holes, with the average diameter in millimeters located on the Y-axis (labeled "D (mm)"). As shown in Tables 2-4 and in FIGS. 8A-8C, adding the examples of the detailing agent disclosed herein to the build material had, on average, a small impact on the accuracy of the 3D objects that were formed. This is illustrated by the fact that the average diameter of the 4 mm holes, 3 mm holes, and 2 mm holes was smaller for the examples including the first and second detailing agents when compared to the comparative examples.

FIGS. 8A-8C show that the 3D objects formed using the detailing agents disclosed herein are pretty accurate, but did became slightly enlarged (i.e., the diameter of the holes shrunk, which indicates that the part is slightly bigger). This may be due to the dye in the detailing agent absorbing some visible radiation that may be emitted by the fusing radiation source. However, since the dye in the detailing agent improves the aesthetics of the formed parts (i.e., reduces color and white pattern formation), the % change is acceptable (noting that a lower % change indicates improved accuracy). It is believed the accuracy in the 3D objects including detailing agents disclosed herein are slightly reduced or maintained because of the specific amount and type of dye used, and because the delay time between the application of the detailing agent and the fusing step was minimal (less than 2 seconds).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50° C. to about 400° C. should be interpreted to include the explicitly recited limits of about 50° C. to about 400° C., as well as individual values, such as 57° C., 95° C., 225° C., 350° C., etc., and sub-ranges, such as from about 70° C. to about 325° C., from about 60° C. to about 170° C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A detailing agent for three-dimensional (3D) printing, comprising:
    a colorant present in an amount ranging from about 1.00 wt % to about 3.00 wt % based on a total weight of the detailing agent, wherein the colorant is a dye having substantially no absorbance in a range of 650 nm to 2500 nm;
    a co-solvent selected from the group consisting of tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl-2-pyrrolidinone, 2-pyrrolidinone, 1,6-hexanediol, and combinations thereof, and the co-solvent is present in an amount ranging from about 1.00 wt % to about 20.00 wt % based on the total weight of the detailing agent;
    a surfactant having a hydrophilic-lipophilic balance (HLB) of less than 10, and the surfactant is present in an amount ranging from about 0.01 wt % to about 5.00 wt % based on the total weight of the detailing agent; and
    a balance of water based on the total weight of the detailing agent.

2. The detailing agent as defined in claim 1 wherein the dye is selected from the group consisting of an azo dye having a sodium or potassium counter ion and a diazo dye having a sodium or potassium counter ion.

3. The detailing agent as defined in claim 2,
    wherein the dye is the azo dye having the sodium counter ion or the diazo dye having the sodium counter ion, and
    wherein the dye is selected from the group consisting of tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of

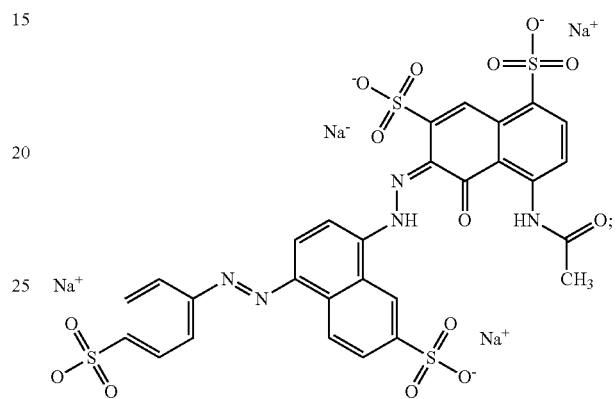

tetrasodium 6-amino-4-hydroxy-3-[[7-sulfonato-4-[(4-sulfonatophenyl)azo]-1-naphthyl]azo]naphthalene-2,7-disulfonate with a chemical structure of

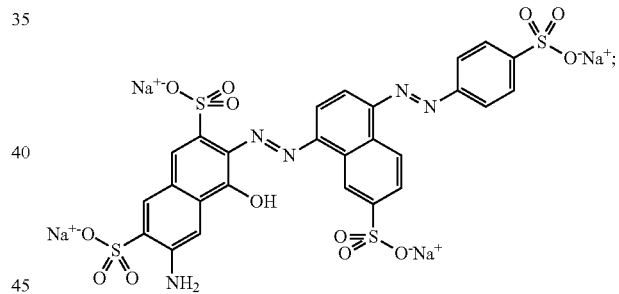

tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of

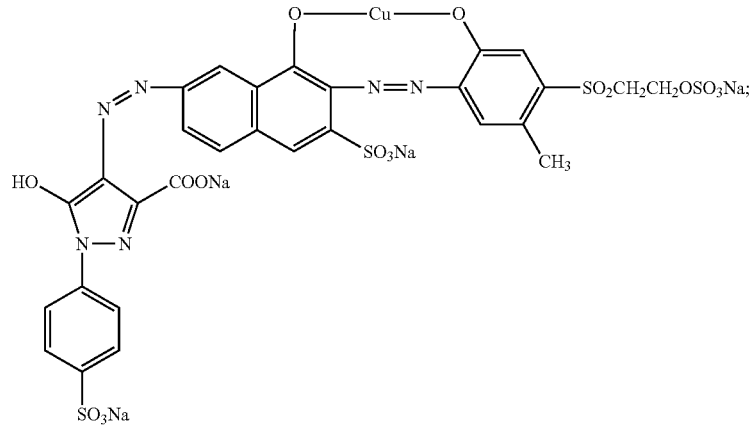

tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

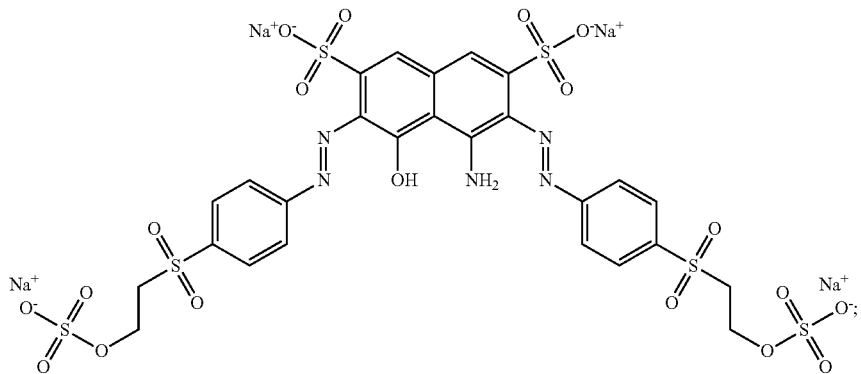

and combinations thereof.

4. The detailing agent as defined in claim 1 wherein the colorant further comprises an other dye having substantially no absorbance above 650 nm, and wherein the other dye is a sodium salt, an ammonium salt, or a potassium salt.

5. The detailing agent as defined in claim 4,
wherein the other dye is selected from the group consisting of ethyl-[4-[[4-[ethyl-[(3-sulfophenyl)methyl]amino]phenyl]-(2-sulfophenyl)ethylidene]-1-cyclohexa-2,5-dienylidene]-[(3-sulfophenyl)methyl]azanium with a chemical structure of

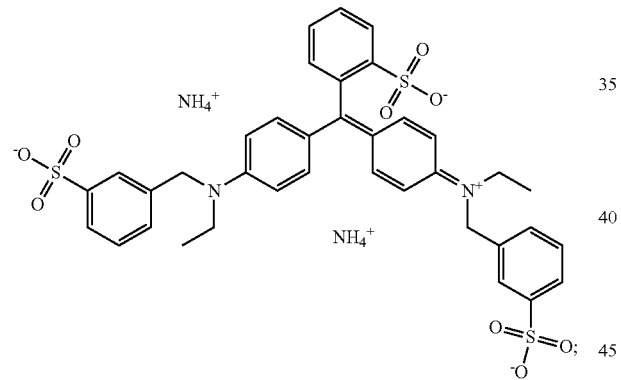

sodium4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of

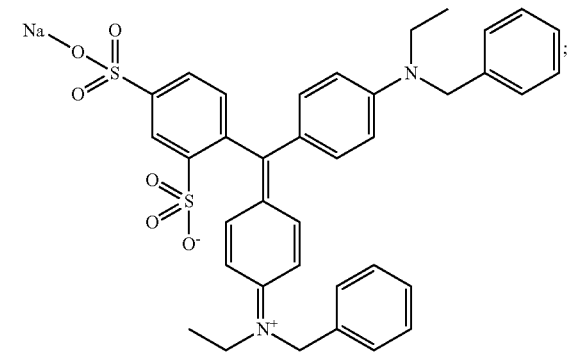

a phthalocyanine with a chemical structure of

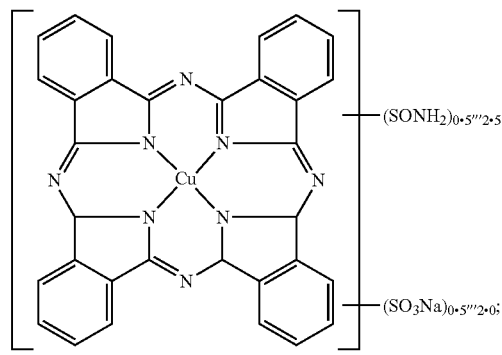

and combinations thereof.

6. The detailing agent as defined in claim 4 wherein:
the amount of the dye ranges from about 1.50 wt % to about 1.75 wt % based on the total weight of the detailing agent; and
the other dye is present in an amount ranging from about 0.25 wt % to about 0.50 wt % based on the total weight of the detailing agent.

7. The detailing agent as defined in claim 1 wherein the detailing agent further includes an anti-kogation agent and a biocide, and wherein:
the anti-kogation agent is selected from the group consisting of oleth-3 phosphate and a metal chelator, and the anti-kogation agent is present in an amount ranging from about 0.10 wt % to about 2.00 wt % based on the total weight of the detailing agent; and
the biocide is selected from the group consisting of an aqueous solution of 1,2-benzisothiazolin-3-one, an aqueous solution of methylisothiazolone, and combinations thereof, and the biocide is present in an amount ranging from about 0.01 wt % to about 0.20 wt % based on the total weight of the detailing agent.

8. The detailing agent as defined in claim 1, excluding additional colorants.

9. The detailing agent as defined in claim 1 wherein the detailing agent, when selectively applied to a portion of a build material during the 3D printing, provides evaporative cooling to the build material portion, and dyes an area of the build material adjacent to the build material portion.

10. A three-dimensional (3D) printing method, comprising:

applying a build material;
heating the build material to a temperature ranging from about 50° C. to about 400° C.;
selectively applying a fusing agent on a portion of the build material;
selectively applying a detailing agent on an other portion of the build material outside an edge boundary of the portion of the build material, the detailing agent penetrating the other portion of the build material and dying an area of the portion of the build material adjacent to the edge boundary, the detailing agent including:
- a colorant present in an amount ranging from about 1.00 wt % to about 3.00 wt % based on a total weight of the detailing agent, wherein the colorant is a dye having substantially no absorbance in a range of 650 nm to 2500 nm;
- a co-solvent selected from the group consisting of tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl-2-pyrrolidinone, 2-pyrrolidinone,1,6-hexanediol, and combinations thereof, and the co-solvent is present in an amount ranging from about 1.00 wt % to about 20.00 wt % based on the total weight of the detailing agent;
- a surfactant having a hydrophilic-lipophilic balance (HLB) of less than 10, and the surfactant is present in an amount ranging from about 0.01 wt % to about 5.00 wt % based on the total weight of the detailing agent; and
- a balance of water based on the total weight of the detailing agent; and exposing the build material to radiation, whereby the fusing agent at least partially fuses the portion of the build material in contact with the fusing agent, and the detailing agent prevents fusing of the other portion of the build material in contact with the detailing agent.

11. The 3D printing method as defined in claim 10, wherein the dye is selected from the group consisting of
tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of

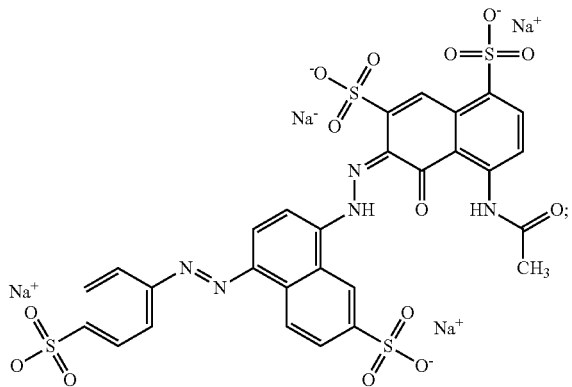

tetrasodium 6-amino-4-hydroxy-3-[[7-sulfonato-4-[(4-sulfonatophenyl)azo]-1-naphthyl]azo]naphthalene-2,7-disulfonate with a chemical structure of

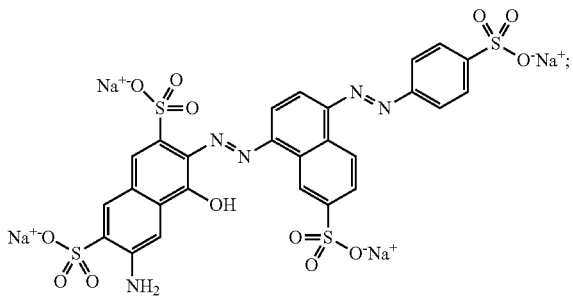

tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of

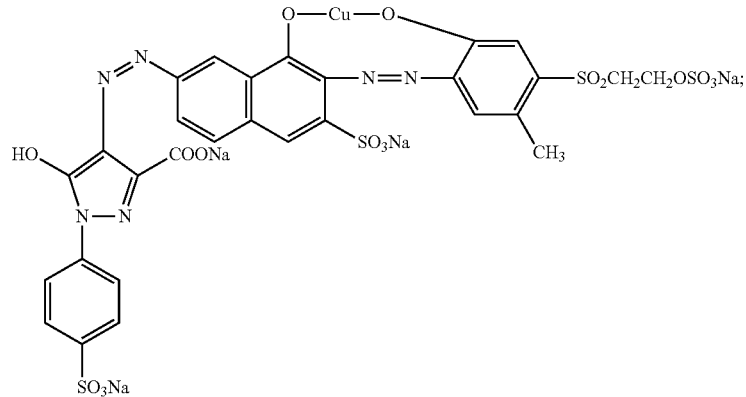

tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

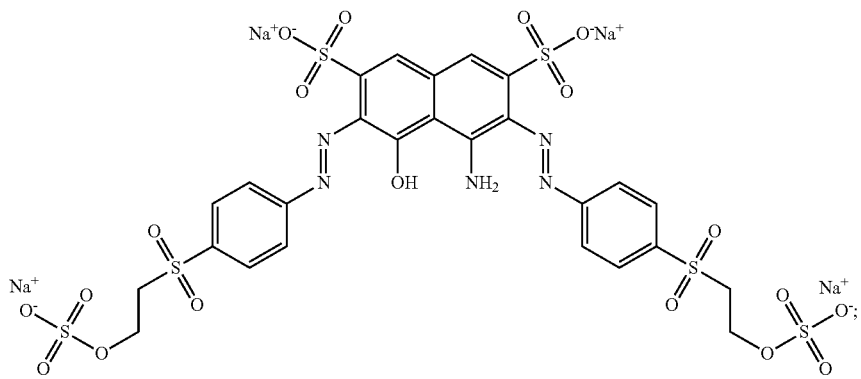

and combinations thereof.

12. The 3D printing method as defined in claim 10, wherein:

the dye is selected from the group consisting of tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of

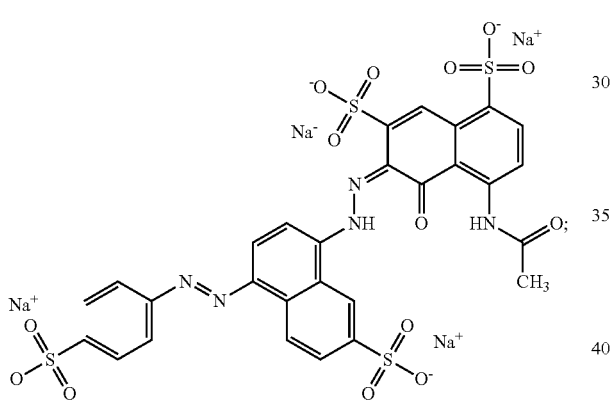

tetrasodium 6-amino-4-hydroxy-3-[[7-sulfonato-4-[(4-sulfonatophenyl)azo]-1-naphthyl]azo]naphthalene-2,7-disulfonate with a chemical structure of

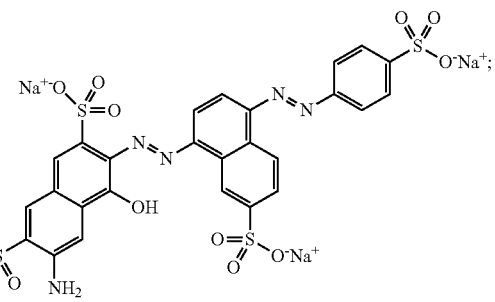

tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of

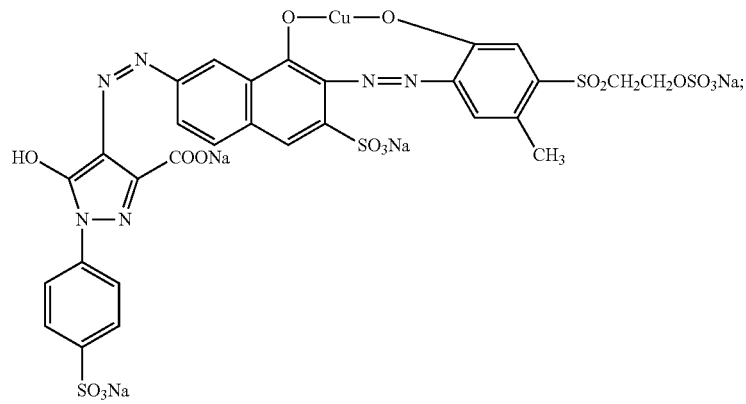

tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

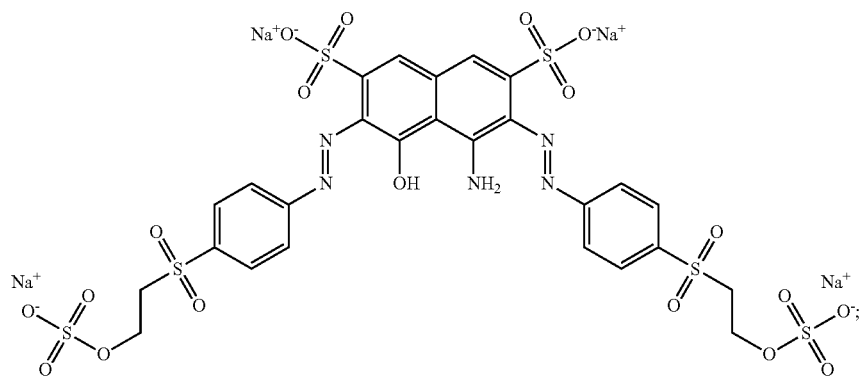

and combinations thereof; and the colorant further comprises an other dye having substantially no absorbance above 650 nm, wherein the other dye is a salt selected from the group consisting of ethyl-[4-[[4-[ethyl-[(3-sulfophenyl) methyl]amino] phenyl]-(2-sulfophenyl) ethylidene]-1-cyclohexa-2,5-dienylidene]-[(3-sulfophenyl) methyl]azanium with a chemical structure of

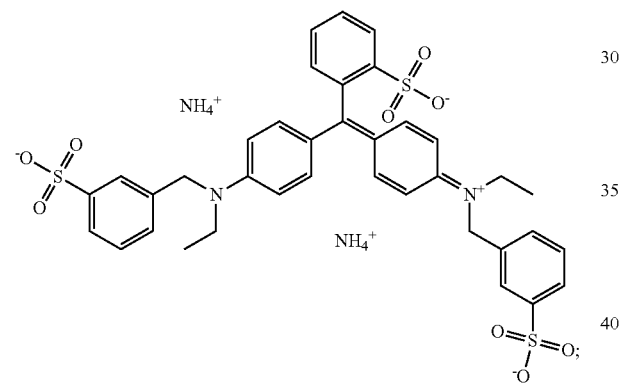

sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of

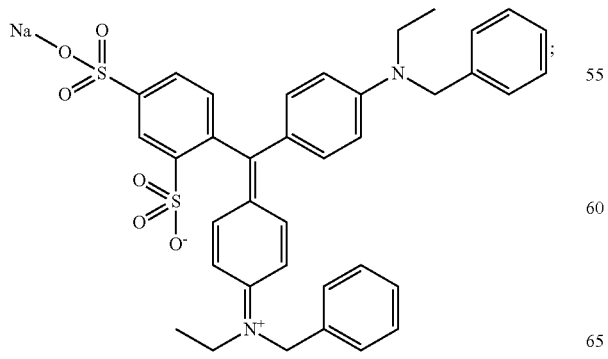

a phthalocyanine with a chemical structure of

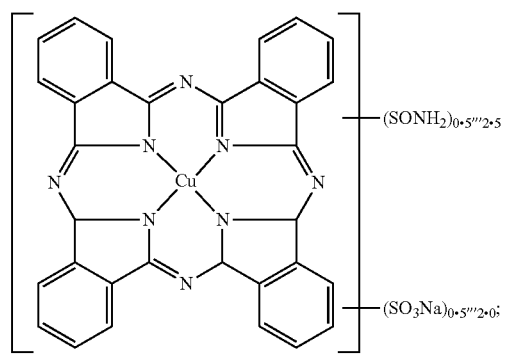

and combinations thereof.

13. The 3D printing method as defined in claim 12 wherein:
the amount of the dye ranges from about 1.50 wt % to about 1.75 wt % based on the total weight of the detailing agent;
the other dye is present in an amount ranging from about 0.25 wt % to about 0.50 wt % based on the total weight of the detailing agent; and
the detailing agent excludes additional colorants.

14. The 3D printing method as defined in claim 10 wherein the build material is applied on a contact surface, and wherein the method further comprises:
selectively applying the fusing agent on the portion of the build material in a pattern of a cross-section of a layer of a three-dimensional object to be formed, the cross-section being parallel to the contact surface; and
selectively applying the detailing agent on the other portion of the build material outside the edge boundary of the portion of the build material that forms the cross-section.

15. A three-dimensional object printing kit, comprising:
a build material;
a fusing agent; and
a detailing agent, including:
a dye having substantially no absorbance in a range of 650 nm to 2500 nm, wherein the dye is present in an amount ranging from about 1.00 wt % to about 3.00 wt % based on a total weight of the detailing agent;
a co-solvent selected from the group consisting of tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl-2-pyrrolidinone, 2-pyrrolidinone, 1,6-hexanediol, and combinations thereof, and the co-solvent is present in an amount ranging from about 1.00 wt % to about 20.00 wt % based on the total weight of the detailing agent;

a surfactant having a hydrophilic-lipophilic balance (HLB) of less than 10, and the surfactant is present in an amount ranging from about 0.01 wt % to about 5.00 wt % based on the total weight of the detailing agent;

an anti-kogation agent selected from the group consisting of oleth-3 phosphate and a metal chelator, and the anti-kogation agent is present in an amount ranging from about 0.10 wt % to about 2.00 wt % based on the total weight of the detailing agent;

a biocide selected from the group consisting of an aqueous solution of 1,2-benzisothiazolin-3-one, an aqueous solution of methylisothiazolone, and combinations thereof, and the biocide is present in an amount ranging from about 0.01 wt % to about 0.20 wt % based on the total weight of the detailing agent; and a balance of water based on the total weight of the detailing agent.

* * * * *

UNITED STATES PATENT AND TRADEMARK OFFICE
CERTIFICATE OF CORRECTION

PATENT NO.         : 10,392,512 B2                          Page 1 of 2
APPLICATION NO.    : 15/546607
DATED              : August 27, 2019
INVENTOR(S)        : Ali Emamjomeh et al.

It is certified that error appears in the above-identified patent and that said Letters Patent is hereby corrected as shown below:

In the Claims

In Column 24, Line 24-39, in Claim 5, delete " 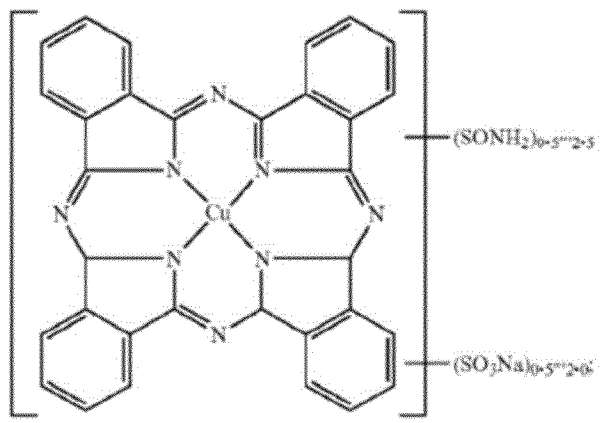 "

Signed and Sealed this
Seventeenth Day of December, 2019

Andrei Iancu
*Director of the United States Patent and Trademark Office*

CERTIFICATE OF CORRECTION (continued)

U.S. Pat. No. 10,392,512 B2 and insert -- 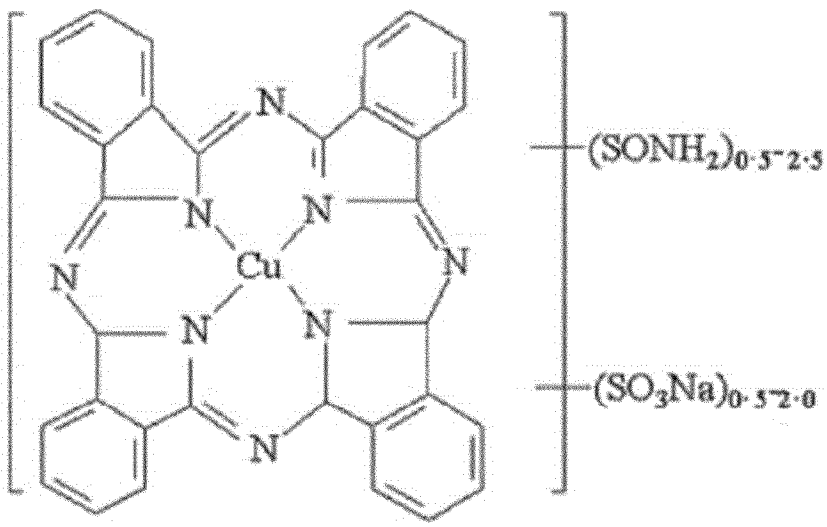 --, therefor.

In Column 30, Line 20-35, in Claim 12, delete

" 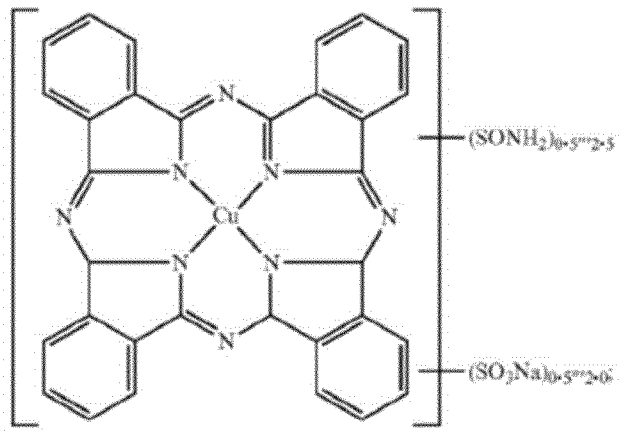 " and insert

-- 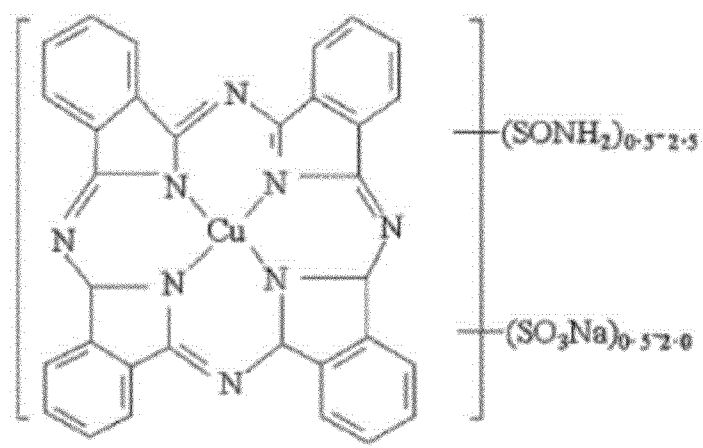 --, therefor.